(12) United States Patent
Matsushita

(10) Patent No.: US 9,461,567 B2
(45) Date of Patent: Oct. 4, 2016

(54) DRIVE CONTROL DEVICE FOR DRIVE SYSTEM INCLUDING VERTICAL CARRIER MACHINE

(71) Applicant: NAKANISHI METAL WORKS CO., LTD., Osaka-shi (JP)

(72) Inventor: Katsumi Matsushita, Osaka (JP)

(73) Assignee: NAKANISHI METAL WORKS CO., LTD., Osaka-shi (JP)

( * ) Notice: Subject to any disclaimer, the term of this patent is extended or adjusted under 35 U.S.C. 154(b) by 0 days.

(21) Appl. No.: 14/426,870

(22) PCT Filed: Aug. 27, 2013

(86) PCT No.: PCT/JP2013/072898
§ 371 (c)(1),
(2) Date: Mar. 9, 2015

(87) PCT Pub. No.: WO2014/042004
PCT Pub. Date: Mar. 20, 2014

(65) Prior Publication Data
US 2015/0222207 A1 Aug. 6, 2015

(30) Foreign Application Priority Data
Sep. 11, 2012 (JP) .................. 2012-199255

(51) Int. Cl.
| H02P 3/00 | (2006.01) |
| H02P 3/14 | (2006.01) |
| B66F 9/02 | (2006.01) |
| B66F 9/07 | (2006.01) |
| B66F 9/24 | (2006.01) |
| B66B 1/30 | (2006.01) |
| H02P 27/06 | (2006.01) |
| H02P 3/18 | (2006.01) |

(52) U.S. Cl.
CPC ............... *H02P 3/14* (2013.01); *B66B 1/302* (2013.01); *B66B 1/308* (2013.01); *B66F 9/02* (2013.01); *B66F 9/07* (2013.01); *B66F 9/24* (2013.01); *H02P 3/18* (2013.01); *H02P 27/06* (2013.01); *Y02B 50/142* (2013.01)

(58) Field of Classification Search
CPC ............ H02P 27/026; H02P 21/146; H02P 23/0045; H02M 5/271; H02M 7/53875; B60L 2200/26
USPC .......................... 318/800, 801, 432, 375, 376
See application file for complete search history.

(56) References Cited

U.S. PATENT DOCUMENTS

| 7,176,648 B2* | 2/2007 | Choi | B29C 45/7666 318/370 |
| 7,212,891 B2* | 5/2007 | Sato | B60W 10/08 180/65.245 |
| 7,511,438 B2* | 3/2009 | Melfi | H02P 3/18 180/65.1 |
| 7,847,495 B2* | 12/2010 | Oyobe | B60K 6/445 318/105 |
| 7,956,489 B2* | 6/2011 | Ichikawa | B60L 11/1868 307/10.1 |
| 8,054,031 B2* | 11/2011 | Uechi | B60K 6/445 180/65.1 |

FOREIGN PATENT DOCUMENTS

| JP | H06-189595 | 7/1994 |
| JP | 2005-263408 A1 | 9/2005 |
| JP | 2007-1712 A1 | 1/2007 |
| JP | 2008-148376 A1 | 6/2008 |
| JP | 2010-168154 A1 | 8/2010 |
| JP | 2011-230864 A1 | 11/2011 |

OTHER PUBLICATIONS

International Search Report for International Application No. PCT/JP2013/072898 dated Nov. 5, 2013.

* cited by examiner

*Primary Examiner* — Rina Duda
(74) *Attorney, Agent, or Firm* — Kratz, Quintos & Hanson, LLP

(57) ABSTRACT

The drive control device for a drive system including a vertical carrier machine includes: a drive control device (A) for an electric motor (M1) mainly for regenerative operation; a drive control device (B) for an electric motor (M2) mainly for power operation; and a regenerative power storage capacitor (12) that is connected between a positive terminal (P11) and a negative terminal (N1) of a direct-current output line of a converter part (1) via a third inrush current suppression circuit (11) in which a third resistor (R3) and a switch (SW3) are connected in parallel, wherein the capacitor (12) has an electrostatic capacitance and a direct-current internal resistance to produce a current value with which braking torque required for velocity control of the electric motor (M1) mainly for regenerative operation is generated by a charging current flowing at storage of the regenerative energy generated by the electric motor (M1).

9 Claims, 13 Drawing Sheets

(a)

(b)

(a)

(b)

DRIVE CONTROL DEVICE FOR DRIVE SYSTEM INCLUDING VERTICAL CARRIER MACHINE

TECHNICAL FIELD

The present invention relates to a drive control device for a drive system including a vertical carrier machine for use in production lines or the like, more specifically, relates to a drive control device configured to reduce consumption of an alternating-current primary power source making effective use of regenerative power generated by a vertical carrier machine with a high ratio of regenerative operation in particular.

BACKGROUND ART

The drive control device for a vertical carrier machine is generally composed of a converter part that converts an alternating-current voltage supplied by an alternating-current primary power source into a direct-current voltage; a smoothing circuit part that smoothes the direct-current voltage converted by the converter part; an inverter that is composed of an inverter part that converts the direct-current voltage smoothed by the smoothing circuit part into an alternating-current voltage at a variable voltage variable frequency and outputs the same to an electric motor in the vertical carrier machine and the like, and an inverter control part that controls the inverter part to output an alternating-current voltage at a variable voltage variable frequency according to a velocity command, and others.

In the case where such a drive control device is used to subject the vertical elevating machine to inverter control, when the elevating machine descends or the like, the electric motor serves as a power generator to feed regenerative energy (electric power) back to the inverter side.

In the case of using a transistor inverter, a feedback diode connected in parallel to the transistor serves as a rectifier supplied power from the electric motor. Thus, since the regenerative power from the electric motor is flown into a smoothing condenser connected to a direct-current bus circuit, the voltage of the direct-current bus circuit in the inverter is increased. This brings about a problem of regeneration failure if the voltage increase is left stand. For the purpose of protecting the internal elements of the inverter, the inverter is designed such that a regeneration overvoltage detection mechanism is activated to stop operation in advance issuing an alarm.

To perform velocity control according to a decided sequence, it is necessary to control the direct-current bus circuit voltage at a predetermined constant voltage. There has been frequently used a method for processing regenerative energy by which a braking unit is installed in a direct-current main circuit, and if the direct-current bus circuit voltage increases to a specific value or more, the transistor of the braking unit is turned on under an instruction from the drive control part to flow the regenerative energy into a resistor connected in series to the transistor, and the regenerative energy is consumed as heat to prevent an increase in the direct-current bus circuit voltage.

However, according to the foregoing method, the regenerative energy is all discarded as heat, which causes a problem that electric power obtained by regenerative operation cannot be used effectively. As a system for storing and reusing regenerative energy, there is a method by which to store regenerative energy in an electric double layer capacitor provided together with a charge-discharge circuit in a single electric motor (for example, refer to Patent Document 1). According to this method, in addition to the components of a general drive system for an elevating machine in which regenerative power is consumed by a braking resistor, there are also provided a charge-discharge circuit (bidirectional DC/DC converter) connected to the direct-current bus circuit, an electric double layer capacitor that is connected to the output side of the charge-discharge circuit to store a direct-current voltage accumulated in a smoothing condenser during charging control, a voltage detection means that detects a voltage generated in the smoothing condenser, and a charge-discharge control unit that compares the detected voltage with a preset reference voltage for determination of a charge or discharge operation.

CITATION LIST

Patent Literatures

Patent Document 1: JP-A No. 2005-263408

SUMMARY OF INVENTION

Technical Problem

In the case where the vertical carrier machine is used as a carrier machine dedicated for lifting down burdens (an unloading lifter), the total weight of the cage and the burdens is larger than that of the balance weight during a descent, and the balance weight is heavier than the cage with no burden during an ascent.

Accordingly, during both descent and ascent, the elevating power motor is rotated by the cage charged with the burdens or the balance weight (the load) to operate as a power generator generating regenerative power.

The drive control device using regenerative energy with the electric storage device and the control device in the vertical carrier machine as described in Patent Document 1 can be applied only to the case where power operation and regenerative operation are alternatively performed at one electric motor in a regular manner to some extent.

That is, the drive control device as described in Patent Document 1 is useful when the regenerative energy stored in each electric motor can be used up during power operation of each electric motor. However, in the vertical carrier machine mainly for regenerative operation, the regenerative power has nowhere to go when the electric storage device becomes full, and the direct-current bus voltage reaches a preset starting voltage of the transistor in the braking unit, and while the direct-current bus voltage is equal to or higher than the preset voltage, the regenerative power is discharged to the resistor and discarded as heat energy.

In addition, when the vertical carrier machine is used as a carrier machine dedicated for lifting down burdens to be operated in actual production facilities or the like, regenerative energy grows continuously as an increasing number of operations are performed as described above. Thus, the energy-saving system with the drive control device as described in Patent Document 1 is insufficient, and it is difficult to build a more effective energy-saving system unless regenerative energy is consumed in combination with other equipment mainly for power operation.

Further, in the configuration of the drive control device for vertical carrier machine described in Patent Document 1, regenerative power is charged or discharged through the bidirectional DC/DC converter, which causes disadvantageously voltage conversion losses during both charging and discharging operations.

In light of the foregoing circumstances, an object of the present invention is to provide a drive control device for a drive system including a vertical carrier machine, for use in production lines or the like, that makes effective use of regenerative power generated by the vertical carrier machine with a high proportion of regenerative operation to minimize consumption of an alternating-current primary power source.

Solution to Problem

To solve the foregoing problems, a drive control device for a drive system including a vertical carrier machine according to the present invention includes: a drive control device for an electric motor mainly for regenerative operation having a first inverter that is composed of a converter part that converts an alternating-current voltage supplied from an alternating-current primary power source into a direct-current voltage, a first smoothing circuit part that smoothes the direct-current voltage converted by the converter part, a first inrush current suppression circuit in which a first resistor and a first switch connected in parallel are connected to a primary side of the first smoothing circuit part, a first inverter part that converts the direct-current voltage smoothed by the first smoothing circuit part into an alternating-current voltage at a variable voltage variable frequency and outputs the same to the electric motor mainly for regenerative operation in the vertical carrier machine, and a regenerative resistor circuit part connected in parallel to the first smoothing circuit part, and a first inverter control part that controls the first inverter part to output the alternating-current voltage at a variable voltage variable frequency according to a velocity command; a drive control device for an electric motor mainly for power operation having, between a positive terminal and a negative terminal of a direct-current output line of the converter part, a second inverter that is composed of a second smoothing circuit part that smoothes a direct-current voltage, a second inrush current suppression circuit in which a second resistor and a second switch connected in parallel are connected to a primary side of the second smoothing circuit part, a second inverter part that converts the direct-current voltage smoothed by the second smoothing circuit part into an alternating-current voltage at a variable voltage variable frequency and outputs the same to the electric motor mainly for power operation, and a second inverter control part that controls the second inverter part to output the alternating-current voltage at a variable voltage variable frequency according to a velocity command; and a capacitor that is connected between the positive terminal and the negative terminal of the direct-current output line of the converter part via a third inrush current suppression circuit in which a third resistor and a third switch are connected in parallel, to store direct-current regenerative power generated at an input portion of the first inverter part during regenerative operation of the electric motor mainly for regenerative operation, wherein the capacitor has an electrostatic capacitance (C) and a direct-current internal resistance (R) to produce a current value with which braking torque required for velocity control of the electric motor mainly for regenerative operation is generated by a charging current flowing at storage of the regenerative energy generated by the electric motor mainly for regenerative operation, within an operating time during which maximum regenerative energy is generated, in series of operations by the electric motor mainly for regenerative operation in the vertical carrier machine (claim 1).

According to the foregoing configuration, the first inverter of the drive control device for the electric motor mainly for regenerative operation includes the capacitor that stores the direct-current regenerative power generated at the input portion of the first inverter part during the regenerative operation of the electric motor mainly for regenerative operation, and supplies the power charged in the capacitor to the second inverter of the drive control device in the electric motor mainly for power operation. By combining the components such that the power-operation power becomes larger than the regenerative power within the same time limit, for example, the regenerative power can be fully used in an effective manner without being discarded as heat energy to the regenerative resistor. Accordingly, it is possible to minimize consumption of the alternating-current primary power source by making effective use of the regenerative power generated by the vertical carrier machine with a high ratio of regenerative operation for use in production lines or the like.

Further, since the regenerative power is not charged or discharged through a bidirectional DC/DC converter, there is no voltage conversion loss caused by the bidirectional DC/DC converter. This makes it possible to store efficiently the regenerative power in the capacitor and use effectively the regenerative power stored in the capacitor.

Furthermore, the capacitor has the electrostatic capacitance (C) and the direct-current internal resistance (R) to produce a current value with which braking torque required for velocity control of the electric motor mainly for regenerative operation is generated by a charging current flowing at storage of the regenerative energy generated by the electric motor mainly for regenerative operation, within an operating time during which maximum regenerative energy is generated, in series of operations by the electric motor mainly for regenerative operation in the vertical carrier machine. This makes it possible to perform velocity control on the vertical carrier machine toward the target along a pre-decided velocity curve.

It is preferable that the capacitor has the electrostatic capacitance (C) in which an average charging current value (Ireg=C·ΔV/Ta) determined by dividing the product (C·ΔV) of the electrostatic capacitance (C) of the capacitor and a voltage increase value (ΔV) caused by storing the regenerative energy in the capacitor by the operating time (Ta) is larger than a current value (Iave) that allows generation of braking torque necessary for velocity control of the electric motor mainly for regenerative operation (Iave<Ireg), and has the direct-current internal resistance (R) in which a current value ($I_0$=ΔV/R) determined by dividing the voltage increase value (ΔV) by the direct-current internal resistance (R) of the capacitor is larger than the average charging current value (Ireg) ($I_0$>Ireg) (claim 2).

It is also preferable that the capacitor uses a calculation formula ($e^{-t/CR}$) for current residual rate at time (t) with a time constant (T=C·R) determined by the product of the electrostatic capacitance (C) and the direct-current internal resistance (R) and the base (e) of natural logarithm to determine the residual rate of the current value ($I_0$) determined by dividing the voltage increase value (ΔV) by the direct-current internal resistance (R) of the capacitor, and has the electrostatic capacitance (C) and the direct-current internal resistance (R) in which the time during which the residual rate is almost zero is shorter than the operating time (Ta) (claim 3).

According to the foregoing configurations, the maximum charging current at the time of storing the regenerative energy in the capacitor takes a current value that allows generation of braking torque necessary for velocity control of the electric motor mainly for regenerative operation in the vertical carrier machine. This makes it possible to perform velocity control of the vertical carrier machine toward the target along the pre-decided velocity curve.

It is further preferable that an on voltage of the transistor in the regenerative resistor circuit part is lower than a withstand voltage of the capacitor (claim 4).

According to the foregoing configuration, electric current is flown into the regenerative resistor by the transistor that turns on under a voltage lower than the withstand voltage of the capacitor, and the voltage of the capacitor does not exceed the withstand voltage (maximum peak voltage), which makes it possible to protect the capacitor from overvoltage.

Therefore, it is possible to reduce the capacitance of the capacitor taking into account the effective use of regenerative power and costs for the same.

It is also preferable that an effective storable capacitance of the capacitor is equal to or larger than the sum of regenerative energy generated in one-cycle operation of the vertical carrier machine (claim 5).

According to the foregoing configuration, the regenerative energy can be stored in the capacitor without waste, which leads to further effective use of the regenerative energy.

It is also preferable that the capacitor is connected directly to the positive terminal of the direct-current output line not via the third resistor but by the third switch that is turned on after the alternating-current primary power source is turned on and the capacitor is completely charged, and the positive terminal of the direct-current output line and the positive terminal of a direct-current bus of the first inverter are short-circuited, and at the same time, the first smoothing circuit part is charged through the first resistor, and after the charging of the first smoothing circuit part is completed, the first switch is turned on and the first inverter becomes operational, and at the same time as the first inverter becomes operational, a fourth switch is turned on to connect the positive terminal of the direct-current bus of the first inverter and the positive terminal of the direct-current bus of the second inverter, and at the same time, the second smoothing circuit part is charged through the second resistor, and after the second smoothing circuit part is completely charged, the second switch is turned on and the second inverter becomes operational (claim 6).

According to the foregoing configuration, the capacitor is first charged, then the first smoothing circuit part of the first inverter is charged, and then the second smoothing circuit part of the second inverter is charged, thereby to make the entire system operational. This allows the regenerative energy to be fully collected and reused.

It is also preferable that the capacitor is connected directly to the positive terminal of the direct-current output line not via the third resistor but by the third switch that is turned on after the alternating-current primary power source is turned on and the capacitor is completely charged, the first smoothing circuit part is charged through the first resistor in parallel to the charging of the capacitor, and after the charging of the first smoothing circuit part is completed, the first switch is turned on and the first inverter becomes operational, and the second smoothing circuit part is charged through the second resistor in parallel to the charging of the capacitor and the first smoothing circuit part, and after the charging of the second smoothing circuit part is completed, the second switch is turned on and the second inverter becomes operational (claim 7).

According to the foregoing configuration, upon activation of the alternating-current primary power source, the capacitor, the first smoothing circuit part, and the second smoothing circuit part start to be charged collectively, and when completion of the charging of the first smoothing circuit part is confirmed, the first inverter becomes operational, and when completion of the charging of the second smoothing circuit part is confirmed, the second inverter becomes operational. Accordingly, it is possible to significantly shorten the time before the entire system becomes operational since power activation, as compared to the case where the entire system becomes operational only after completion of charging of the capacitor.

It is also preferable that the capacitor is connected directly to the positive terminal of the direct-current output line not via the third resistor but by the third switch that is turned on after the alternating-current primary power source is turned on and the capacitor is completely charged and a fifth switch that is connected in series to the third inrush current suppression circuit, and after the activation of the alternating-current primary power source, the first smoothing circuit part is charged through the first resistor, and after the charging of the first smoothing circuit part is completed, the first switch is turned on, and the second smoothing circuit part is charged through the second resistor in parallel to the charging of the first smoothing circuit part, and after the charging of the second smoothing circuit part is completed, the second switch is turned on, and after the charging of the first smoothing circuit part and the second smoothing circuit part is completed, the fifth switch is turned on, and charging of the capacitor is started and the first inverter and the second inverter become operational (claim 8).

According to the foregoing configuration, after the charging of the first smoothing circuit part and the second smoothing circuit part is completed, the fifth switch is turned on and the first inverter and the second inverter become operational. Thus, it is possible to shorten significantly the time before the entire system becomes operational since power activation, as compared to the configuration in which the entire system becomes operational only after the charging of the capacitor is completed.

In addition, the capacitor is charged after the charging of the first smoothing circuit part and the second smoothing circuit part is completed, which reduces a load on the converter part.

It is also preferable that a voltage measurement means for the capacitor is included, and the capacitor is connected directly to the positive terminal of the direct-current output line not via the third resistor but by the third switch that is turned on after the alternating-current primary power source is turned on and the capacitor is completely charged and the fifth switch that is connected in series to the third inrush current suppression circuit, and after activation of the alternating-current primary power source, the first smoothing circuit part is charged through the first resistor, and after the charging of the first smoothing circuit part is completed, the first switch is turned on, and the second smoothing circuit part is charged through the second resistor in parallel to the charging of the first smoothing circuit part, and after the charging of the second smoothing circuit part is completed, the second switch is turned on, and after the charging of the first smoothing circuit part and the second smoothing circuit part is completed, when the voltage value of the capacitor measured by the voltage measurement means is less than a preset threshold value, the fifth switch is turned on and charging of the capacitor is started, and the first inverter and the second inverter become operational, and after completion of the charging, when the voltage value of the capacitor measured by the voltage measurement means is equal to or larger than the preset threshold value, the fifth switch is turned on and the charging of the capacitor is completed, and the first inverter and the second inverter become operational (claim 9).

According to the foregoing configuration, after the charging of the first smoothing circuit part and the second smoothing circuit part is completed, the fifth switch is turned on and the first inverter and the second inverter become operational. Thus, it is possible to shorten significantly the time before the entire system becomes operational since power activation, as compared to the configuration in which the entire system becomes operational only after the charging of the capacitor is completed.

In addition, the capacitor is charged after the charging of the first smoothing circuit part and the second smoothing circuit part is completed, which reduces a load on the converter part.

Furthermore, after completion of the charging, when the voltage value of the capacitor measured by the voltage measurement means is equal to or larger than the preset threshold value, there is no need to wait for charging of the capacitor, which prevents deterioration in the reuse efficiency of regenerative energy.

Advantageous Effects of Invention

As described above, according to the drive control device for a drive system including a vertical carrier machine in the present invention, the capacitor included in the first inverter of the drive control device for the electric motor mainly for regenerative operation in the vertical carrier machine can store regenerative energy and supply the stored power to the second inverter of the drive control device for the electric motor mainly for power operation. Accordingly, by effectively using the regenerative power, it is possible to produce the advantage of minimizing consumption of the alternating-current primary power source and the like.

BRIEF DESCRIPTION OF THE DRAWINGS

FIG. 11($a$) represents the case where no regenerative energy is generated and FIG. 11($b$) represents the case where regenerative energy is generated;

DESCRIPTION OF EMBODIMENTS

First Embodiment

Figure 1:
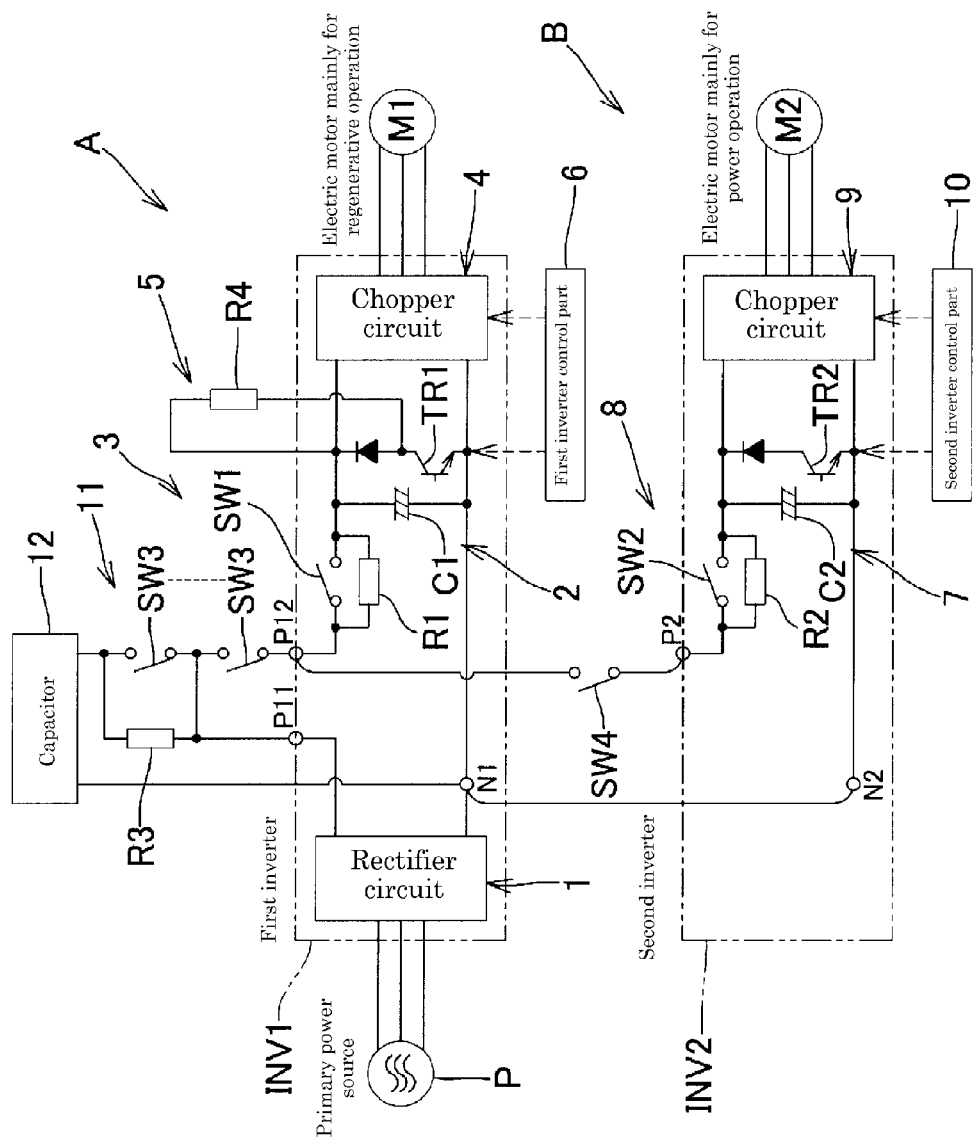
FIG. 1 is a block diagram of a configuration of a drive control device for a drive system including a vertical carrier machine according to a first embodiment of the present invention.

As illustrated in the block diagram of FIG. 1, a drive control device for a drive system including a vertical carrier machine according to a first embodiment of the present invention includes a drive control device A for an electric motor M1 mainly for regenerative operation in a vertical carrier machine and a drive control device B of an electric motor M2 mainly for power operation in the same.

In this example, the drive control device A includes: a first inverter INV1 that is composed of a converter part 1 (rectifier circuit) that converts an alternating-current voltage supplied from an alternating-current primary power source P into a direct-current voltage, a first smoothing circuit part 2 that smoothes the direct-current voltage converted by the converter part 1, a first inrush current suppression circuit 3 in which a first resistor R1 and a first switch SW1 connected in parallel are connected to a primary side of the first smoothing circuit part 2, a first inverter part 4 (chopper circuit) that converts the direct-current voltage smoothed by the first smoothing circuit part 2 into an alternating-current voltage at a variable voltage variable frequency and outputs the same to the electric motor M1 mainly for regenerative operation, and a regenerative resistor circuit part 5 that is connected in parallel to the first smoothing circuit part 2; and a first inverter circuit part 6 that control the first inverter part 4 to output an alternating-current voltage at a variable voltage variable frequency according to a velocity command.

In addition, the drive control device B includes: a second inverter INV2 that is composed of a second smoothing circuit part 7 that smoothes a direct-current voltage, a second inrush current suppression circuit 8 in which a second resistor R2 and a second switch SW2 connected in parallel are connected to a primary side of the second smoothing circuit part 7, and a second inverter part 9 that converts the direct-current voltage smoothed by the second smoothing circuit part 7 into an alternating-current voltage at a variable voltage variable frequency and outputs the same to the electric motor M2 mainly for power operation; and a second inverter control part 10 that controls a second inverter part 9 to output an alternating-current voltage at a variable voltage variable frequency according to a velocity command.

Further, the drive control device A includes a capacitor 12 that is connected between a positive terminal P11 and a negative terminal N1 of a direct-current output line of the converter part 1 via a third inrush current suppression circuit 11 in which a third resistor R3 and a third switch SW3 are connected in parallel and stores direct-current regenerative power generated at an input portion of the first inverter part 4 during regenerative operation of the electric motor M1 mainly for regenerative operation.

Furthermore, a positive terminal P12 of a direct-current bus in the first inverter INV1 and a positive terminal P2 of a direct-current bus in the second inverter INV2 are connected via a fourth switch SW4, and a negative terminal (a negative terminal of the direct-current output line in the converter part 1) N1 of a direct-current bus in the first inverter INV1 and a negative terminal N2 of a direct-current bus in the second inverter INV2 are short-circuited.

In addition, the capacitor 12 also includes an electric double layer capacitor, a lithium ion capacitor, and a secondary battery with the capability of fast charging and discharging.

Figure 2:
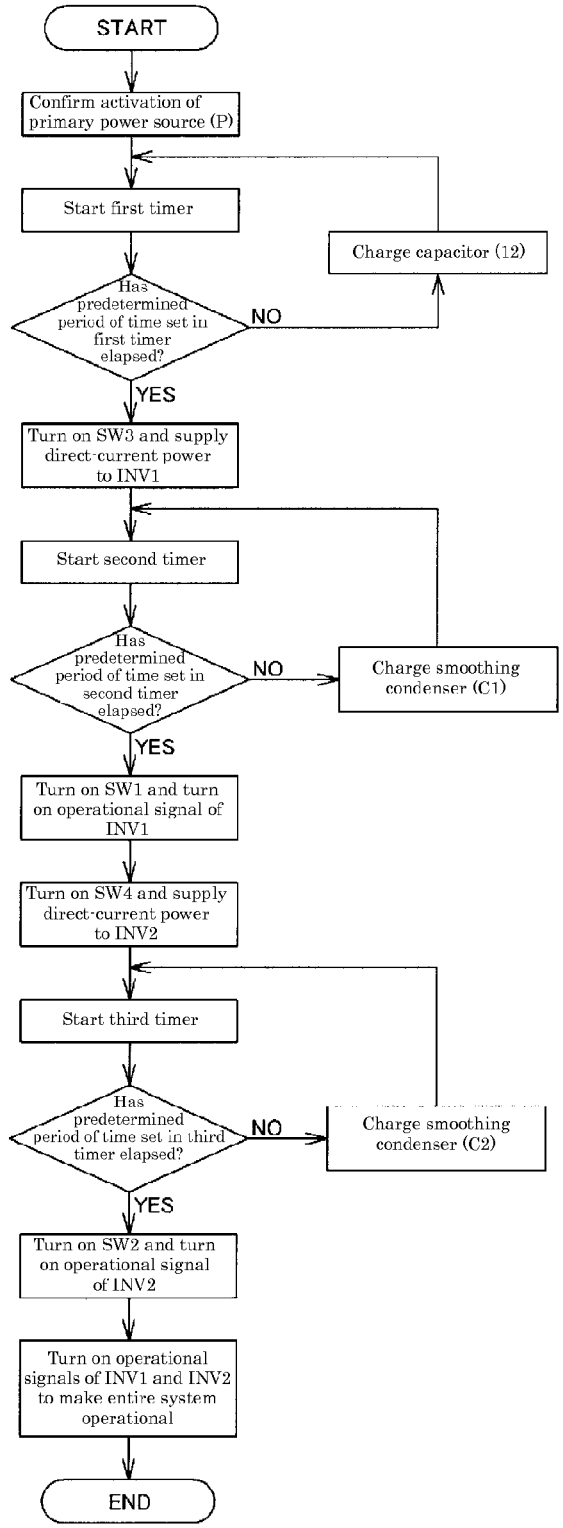
FIG. 2 is a flowchart of operations by the drive control device.

As illustrated in the block diagram of FIG. 1 and the flowchart of FIG. 2, when the first inverter INV1 is powered by the alternating-current primary power source P, the capacitor 12 is charged from the converter part 1 (rectifier circuit) through the positive terminal P11 and the third resistor R3 of the third inrush current suppression circuit 11. Assuming that the voltage of the alternating-current primary power source P is 200 VAC, the capacitor 12 is charged up to 282 VDC.

Upon the start of charging of the capacitor 12, the first timer starts to operate. When a predetermined period of time set in a first timer has elapsed, that is, when a predetermined charging time for the capacitor 12 has elapsed, the third switch SW3 of the third inrush current suppression circuit 11 is turned on. Accordingly, the capacitor 12 is connected directly to the positive terminal P12 not via the third resistor R3, a direct-current voltage of 282 VDC is applied to the positive terminal P12, and the first smoothing circuit part 2 (smoothing condenser C1) is subsequently charged through the first resistor R1 of the first inrush current suppression circuit 3.

Upon the start of charging of the first smoothing circuit part 2 (smoothing condenser C1), a second timer starts to operate. When a predetermined period of time set in the second timer has elapsed, that is, when a predetermined charging time for the first smoothing circuit part 2 (smoothing condenser C1) has elapsed, the first switch SW1 of the first inrush current suppression circuit 3 is turned on, and an operational signal of the first inverter INV1 is turned on.

When the operational signal of the first inverter INV1 is turned on, the fourth switch SW4 is turned on and the second smoothing circuit part 7 (smoothing condenser C2) is charged through the second resistor R2 of the second inrush current suppression circuit 8 in the second inverter INV2.

Upon the start of charging of the second smoothing circuit part 7 (smoothing condenser C2), a third timer starts to operate. When a predetermined period of time set in the third timer has elapsed, that is, when a predetermined charging time for the second smoothing circuit part 7 (smoothing condenser C2) has elapsed, the second switch SW2 of the second inrush current suppression circuit 8 is turned on and an operational signal of the second inverter INV2 is turned on.

Through the foregoing processes, the operational signals of the first inverter INV1 and the second inverter INV2 are turned on to allow the entire system to be operational.

In the foregoing description, the completion of charging of the capacitor 12, the first smoothing circuit part 2 (smoothing condenser C1), and the second smoothing circuit part 7 (smoothing condenser C2) is confirmed by the use of the first timer, the second timer, and the third timer. Alternatively, the completion of the charging may be confirmed by another means such as voltage detection.

While the vertical carrier machine performs regenerative operation, the regenerative power generated at the electric motor M1 mainly for regenerative operation is stored directly in the capacitor 12 because the first switch SW1 and the third switch SW3 are on. At that time, when the electric motor M2 mainly for power operation is under operation, the regenerative power is also supplied to the second inverter INV2 side. When the electric motor M2 mainly for power operation is stopped, the regenerative power is all charged into the capacitor 12 to raise the storage potential of the capacitor 12.

When the storage potential of the capacitor 12 increases up to 380 VDC, the first inverter control part 6 detects the potential of the smoothing condenser C1 in the first inverter INV1 and turns on the transistor TR1 of the regenerative resistor circuit part 5 to flow the regenerative power into the regenerative resistor R4. The regenerative power is consumed as heat energy at the regenerative resistor R4 to prevent overvoltage of the capacitor 12.

In addition, if the electric motor M1 mainly for regenerative operation is stopped during operation of the electric motor M2 mainly for power operation, when the potential of the capacitor 12 is 282 VDC or more, the electric motor M2 mainly for power operation continues operation with the power stored in the capacitor 12. When the potential of the capacitor 12 is less than 282 VDC, the electric motor M2 mainly for power operation continues operation with power supplied from the alternating-current primary power source P.

In the foregoing description, the one electric motor M2 and the one second inverter INV2 are provided in the drive control device B for the electric motor mainly for power operation consuming the regenerative power. Alternatively, two or more electric motor mainly for power operation and two or more inverter may be provided. However, the capacitance of the one electric motor mainly for power operation needs to fall within the current limit value of the converter part 1 (rectifier circuit) of the drive control device A for the electric motor M1 mainly for regenerative operation.

According to the drive control device for a drive system including a vertical carrier machine described above, the first inverter INV1 of the drive control device A for the electric motor M1 mainly for regenerative operation includes the capacitor 12 that stores direct-current regenerative power generated at the input portion of the first inverter part 4 during regenerative operation of the electric motor M1 mainly for regenerative operation, and supplies the power charged in the capacitor 12 to the second inverter INV2 of the drive control device B for the electric motor M2 mainly for power operation. By combining the components such that the power-operation power becomes larger than the regenerative power within the same time limit, for example, the regenerative power can be fully used in an effective manner without being discarded as heat energy to the regenerative resistor. Accordingly, it is possible to minimize consumption of the alternating-current primary power source P by using effectively the regenerative power generated by the vertical carrier machine with a high ratio of regenerative operation for use in production lines or the like.

Further, since the regenerative power is charged directly into the capacitor 12 or discharged directly from the capacitor 12 not through the converter, there is no voltage conversion loss and it is possible to store efficiently the regenerative power in the capacitor 12 and use effectively the regenerative power stored in the capacitor 12, as compared to the case where the regenerative power is returned to the primary power source side through a bidirectional DC/DC converter for pressure increase and decrease, or a regenerative converter as in a primary power source regenerative system.

Next, descriptions will be given as to verification experiments and the like of the drive control device for a drive system including a vertical carrier machine in the present invention, making effective use of regenerative power in production lines or the like.

Figure 3:
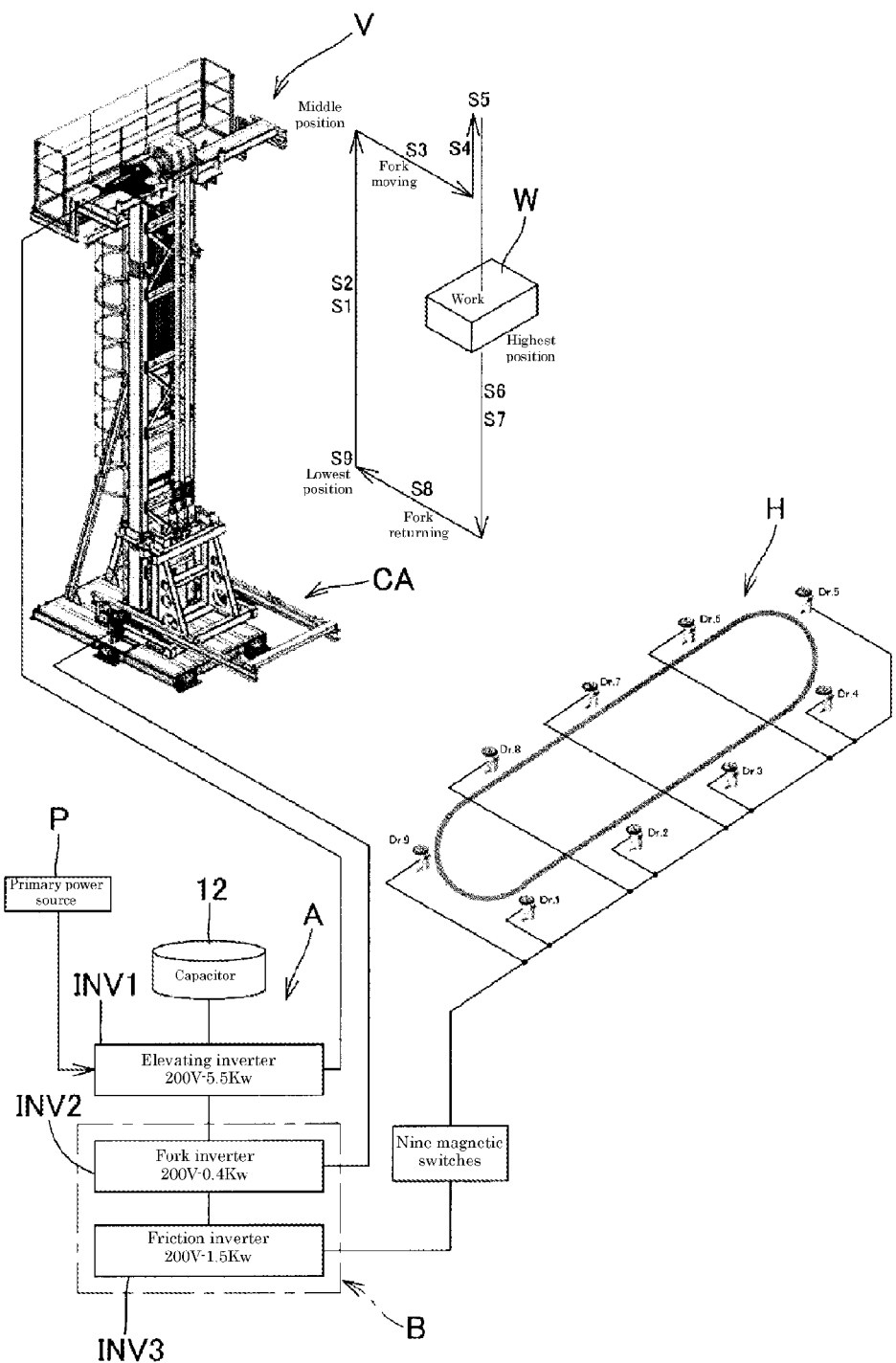
FIG. 3 includes a schematic block diagram of an experimental installation for the drive control device for a drive system including a vertical carrier machine, a diagram for describing operations, and a diagram showing mechanical specifications.

As illustrated in the schematic block diagram of an experimental installation for the drive control device for a drive system including a vertical carrier machine and the diagram for describing operations of FIG. 3, the experimental installation include a vertical carrier machine V and a horizontal delivery conveyor H.

The mechanical specifications for the unloading vertical carrier machine (V) are as follows: Cage weight: 920 Kg, Work weight: 700 Kg, Balance weight: 1270 Kg, Lifting height: 4.0 m, Speed: High speed 50 m/min Low speed 7.5 m/mm, Elevating electric motor: 5.5 Kw, Fork electric motor: 0.4 Kw, Friction electric motor: 0.1 Kw×9 units (Four units are always under alternate operation).

The vertical carrier machine V is configured to move a work W from a high position to a low position by the use of a cage CA including a burden acceptor capable of forward and backward movement by a slide fork in the horizontal direction.

The horizontal delivery conveyor H is configured to deliver a non-self-running cart not illustrated loaded with the work W delivered from the vertical carrier machine V, to friction roller drive devices Dr. 1 to Dr. 9 along a horizontal loop pathway.

Based on the mechanical specifications, when the vertical carrier machine V loaded with the work W descends, the cage side is heavier by 350 kg (920 kg (cage weight)+700 kg (work weight)−1270 kg (balance weight)=350 kg), and when the vertical carrier machine V without the work W ascends, the weight side is heavier by 350 kg (1270 kg (balance weight)−920 kg (cage weight)=350 kg). In the both decent and ascent, the electric motor for elevation operates as a power generator generating regenerative power, and the inverter of the electric motor for elevation is the first inverter INV1 of the drive control device A for the electric motor for elevation mainly for regenerative operation.

In addition, the inverter of the electric motor for slide fork driving and the inverter of the electric motor for the friction roller drive devices Dr. 1 to Dr. 9 are the second inverter INV2 and the third inverter INV3 of the drive control device B for the electric motor mainly for power operation.

According to steps S1 to S9 shown in FIG. 3 (refer to also "Description of operations" in Table 1), the power-operation power amount and the regenerative power amount in one-cycle operation of the vertical carrier machine V are determined, and the results of the determination are provided in Table 1. In Table 1, the plus amounts of power are the amounts of power-operation power and the minus amount of power are the amounts of regenerative power.

An auxiliary DL (drop lifter) described in relation to steps S5 and S9 but not illustrated in FIG. 3 is configured to lift the work W from the tentative stage at the lowest position to the highest position for measurement testing. The step S5 (waiting for descent of the auxiliary DL) refers to waiting time after the delivery of the work W at the highest position and before the auxiliary DL descends without the work W from the highest position to the lowest position. The step S9 (waiting for ascent of the auxiliary DL) refers to waiting time before the auxiliary DL lifts the work W from the lowest position to the highest position.

(Specifications for the Capacitor)

As the capacitor 12 of the first inverter INV1, two capacitor modules connected in series were used according to the following specifications:
Type: Electric double layer capacitor
Rating voltage: DC378V
Maximum peak voltage: DC406V
Electrostatic capacitance (C): 1.5 F
Direct-current internal resistance (R): 206 mΩ
(Storage Capacitance of the Capacitor)

The working voltage range of the capacitor 12 covers 282V to 380V. Effective storable power amount U within the working voltage range can be determined by the following equation (1):

$$U=(1/2) \cdot C \cdot (V1^2 - V2^2) = (0.5) \cdot (1.5) \cdot (380^2 - 282^2) = 48,657 \text{ J} \tag{1}$$

In the case of the foregoing experimental installation, according to Table 1, the total offsetting of the amount of regenerative power and the amount of power-operation power generated during one-cycle operation of the vertical carrier machine V is 10,395 J after completion of the one-cycle operation.

Meanwhile, the storable capacitance of the used capacitor 12 is 48,657 J as expressed by the equation (1), which is sufficient for the offsetting.

The foregoing experimental installation have the function of protecting the capacitor from overvoltage described later, and the capacitance of the capacitor may be further smaller than the offset amount (10,395 J) of regenerative power and power-operation power in one cycle. The reason for that will be described below.

First, the reason will be explained in relation to the working voltage range of the capacitor 12 (282 VDC to 380 VDC).

Since the voltage of the alternating-current primary power source P illustrated in FIG. 1 is 200 VAC, the voltage is converted into a direct-current voltage of 282 VDC as a square root of two at the converter part 1 (rectifier circuit) of the first inverter INV1. Accordingly, the capacitor 12 is always charged under the voltage as far as the primary power source P is connected, and thus the lower limit voltage is 282 VDC.

In the case of using a general-purpose 200V inverter, when the regenerative power from the electric motor M1 is fed back to the first inverter INV1, the regenerative power is stored in the smoothing condenser C1 to raise the direct-current bus voltage at both ends of the capacitor.

TABLE 1

| Description of operations | | Power amount (J) | | | | | | |
|---|---|---|---|---|---|---|---|---|
| Operations | Time(s) | Regenerative operation | Power operation | Difference | | | Time(s) | Power amount (J) |
| S1 High-speed ascent | 4.2 | −5,432 | 0 | −5,432 | | Acceleration | 1.5 | −188 |
| S2 Low-speed ascent | 2.3 | −1,955 | 0 | −1,955 | | High-speed ascent & deceleration | 2.7 | −5,244 |
| S3 Fork moving | 4.5 | 0 | 1,800 | 1,800 | | | | |
| S4 Low-speed ascent | 5.0 | −326 | 868 | 542 | | | | |
| S5 Waiting for descent of auxiliary DL | 11.5 | — | — | — | | | | |
| S6 High-speed descent | 4.6 | −5,724 | 104 | −5,620 | | | | |
| S7 Low-speed descent | 3.9 | −2,167 | 637 | −1,530 | | | | |
| S8 Fork returning | 4.5 | 0 | 1,800 | 1,800 | | | | |
| S9 Waiting for ascent of auxiliary DL | 9.5 | — | — | — | | | | |
| Vertical carrier machine | 50.0 | −15,604 | 5,209 | −10,395 | | | | |
| Average of four friction motors under continuous operation in one cycle | | | | | | | | |

The first inverter control part 6 is configured to, when detecting that the voltage of the direct-current bus increases up to 380V, turns on the transistor TR1 of the regenerative resistor circuit part 5 to flow the regenerative power stored in the smoothing condenser C1 into the regenerative resistor R4 for consumption as heat energy.

These operations are also applicable to the state in which the capacitor 12 is connected in parallel to the smoothing condenser C1. Therefore, the direct-current bus voltage is always kept within the range of 282 VDC to 380 VDC.

The capacitor 12 needs to have a withstand voltage (maximum peak voltage) equal to or higher than the upper limit voltage of 380 VDC. However, the maximum peak voltage of the capacitor 12 is 406 VDC as in the foregoing specifications and thus has no problem.

As described above, the capacitor 12 has a sufficient storage capacitance and a withstand voltage without any problem. Accordingly, it is preferable to select the capacitor 12 with a smaller electrostatic capacitance for cost reduction. In addition, the discharge starting voltage (380 VDC) of the first inverter INV1 relative to the regenerative resistor R4 is lower than the withstand voltage of the capacitor 12. Thus, even if the stored power increases to raise the capacitor potential, the discharge into the regenerative resistor R4 takes place before the withstand voltage is reached. This makes it possible to protect the capacitor 12 from overvoltage. That is, the first inverter INV1 has the function of protecting the capacitor 12 from overvoltage.

(Changes in Capacitor Potential)

Table 2 shows changes in stored energy amount and stored potential of the capacitor 12 at steps S1 to S9 of operations of the vertical carrier machine V described in Table 1. Of the electric motors for the friction roller drive devices Dr. 1 to Dr. 9 on the horizontal delivery conveyor H, four electric motors are constantly operated (100 W per unit).

resistor circuit part 5 is turned on as described above such that the regenerative energy is consumed as heat energy at the regenerative resistor R4 and the capacitor potential does not exceed 380V. However, in the case of the experimental installation, as far as the capacitor 12 operates normally, the capacitor potential increases only up to about 293.1V.

Therefore, unless some energy is manually stored in advance in the capacitor 12, even if the capacitor 12 is continuously operated, the voltage of the capacitor 12 does not increase up to the on voltage (380V) of the transistor TR1 of the regenerative resistor circuit part 5.

From the foregoing matter, it is conceived that the required effective storable capacitance of the capacitor 12 for storage of regenerative power does not need to meet the total of the regenerative energy in one cycle or the offsetting of the regenerative energy and the power-operation energy, but only needs to meet the maximum regenerative energy (7,387 J in Table 2) generated at a series of consecutive operations in one cycle (such as ascent or descent, and according to Table 2, the steps S1 and S2 (ascent to middle: high-speed ascent and low-speed ascent)).

Using the capacitor 12 with such an effective storable capacitance makes it possible to realize cost reduction. In addition, using the capacitor 12 in combination with the regenerative resistor circuit part 5 makes it possible to prevent overvoltage.

Unless any constraint is placed on operating conditions, the capacitor 12 only needs to have an effective storable capacitance enough for the total amount of regenerative energy generated in one-cycle operation.

In addition, as illustrated in FIG. 3, by using the vertical carrier machine V in combination with the horizontal delivery conveyor H mainly for power operation and requiring larger energy than the regenerative energy generated at the vertical carrier machine V in one-cycle operation, it is possible to use fully the regenerative energy in an effective manner.

TABLE 2

| | Operations | | | | | | | |
|---|---|---|---|---|---|---|---|---|
| Energy | Initial state | Ascent to middle S1 & S2 | Fork moving from end S3 | Ascent to highest position S4 | Waiting for ascent to highest position S5 | Descent to lowest position S6 & S7 | Fork returning to end S8 | Waiting for descent to lowest position S9 |
| Operating time (s) | 0.0 | 6.5 | 4.5 | 5.0 | 11.5 | 8.5 | 4.5 | 9.5 |
| Elavating energy (J) | — | −7,387 | — | 542 | — | −7,150 | — | — |
| Fork power operation energy (J) | — | — | 1,800 | — | — | — | 1,800 | — |
| Friction power operation energy (J) | 0.0 | 2,600 | 1,800 | 2,000 | 4,600 | 3,400 | 1,800 | 3,800 |
| Stored energy (J) | 59,643 | 64,430 | 60,830 | 59,643 | 59,643 | 63,393 | 59,793 | 59,643 |
| Capacitor potential (V) | 282.0 | 293.1 | 284.8 | 282.0 Primary power consumption | 282.0 Primary power consumption | 290.7 | 282.4 | 282.0 Primary power consumption |

It can be seen from Table 2 that, even when the capacitor potential is about to be lower than 282V, the primary power source P supplies power and thus the capacitor potential actually does not fall below 282V.

For example, according to Table 2, during the step S4 (ascent to highest position: low-speed ascent), the step S5 (Waiting for ascent to highest position: Waiting for descent of the auxiliary DL), and the step S9 (waiting for descent to lowest position: waiting for ascent of the auxiliary DL), the energy stored in the capacitor 12 is about to fall below 59,643 J, and thus the primary power source P with a high potential supplies power to kept the capacitor potential at 282V.

In addition, if the capacitor potential increases and is about to exceed 380V, the transistor TR1 of the regenerative (Regenerative Energy Processing by the Braking Resistor Circuit)

To ascertain whether sufficient braking torque can be obtained from the charging current flowing into the capacitor 12, the control of the capacitor 12 in the embodiment will be compared to the control of a conventional inverter-driving electric motor using a braking resistor circuit that consumes regenerative energy as heat energy without the use of the capacitor 12.

Figure 4:
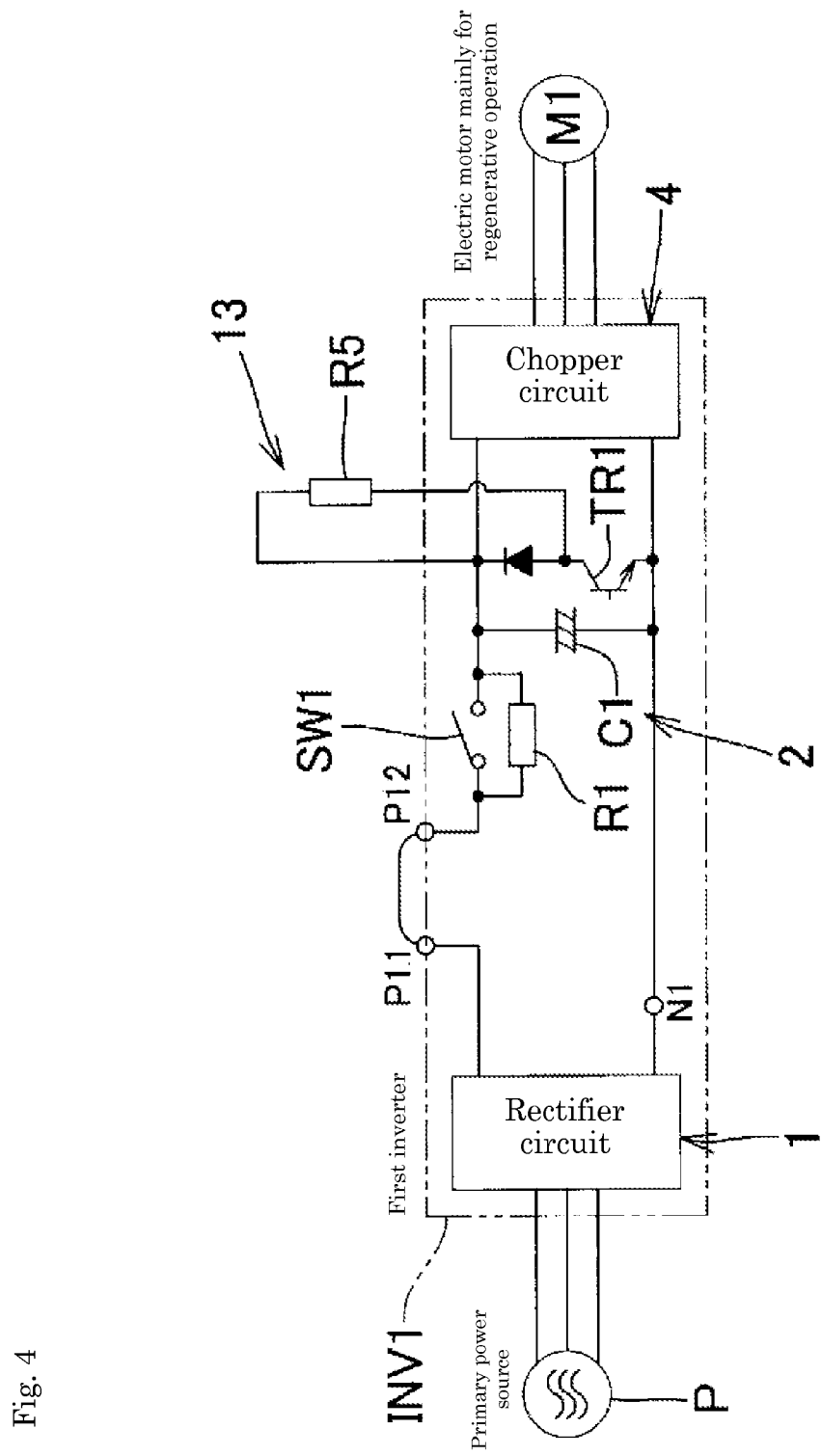
FIG. 4 is a schematic block diagram of a conventional drive control device for a drive system using a braking resistor circuit that consumes regenerative energy as heat energy without the use of a capacitor.

According to the block diagram of the conventional drive control device for drive system using a braking resistor circuit 13 schematically illustrated in FIG. 4, a braking resistor R5 selected using a selection software program produced by an inverter manufacturer is used to calculate the value of electric current flowing into the braking resistor R5 to determine clearly the value of regenerative current to stop the vertical carrier machine V at a decided position within a limited period of time.

However, it is to be noted here that, when the regenerative energy is stored in the capacitor, the charging current flows continuously, but when the regenerative energy is to be consumed as heat energy with the use of the braking resistor circuit 13, the electric current into the resistor circuit is repeatedly turned on and off in an intermittent manner.

Accordingly, the duty cycle is determined from the on/off ratio in the configuration using the braking resistor circuit 13, and is multiplied by the value of the electric current flowing into the braking resistor R5 to determine average current, and the average current is set as a subject to be compared.

The specifications for the electric motor, the inverter, and the braking resistor, and the like in the vertical carrier machine V are as follows:
Electric motor (M1): three-phase 200V, 5.5 kW, quadrupole
Inverter (INV1): three-phase 200V, 5.5 kW
Built-in smoothing condenser (C1): 3120 µF
On voltage of the regeneration transistor (TR1): 379V or higher
Off voltage of the regeneration transistor (TR1): lower than 379V (377V or lower, taking lag time into account)
Braking resistor (R5): 20Ω
(Average Regenerative Current Flowing in the Braking Resistor)

When the regenerative energy is stored in the smoothing condenser C1 and the voltage of the both ends exceeds 379V, the transistor TR1 of the braking resistor circuit 13 is turned on. At that time, maximum value Imax of the electric current flowing into the braking resistor R5 (20Ω) is determined by the following equation (2):

$$Imax=379/20=18.95 \text{ A} \qquad (2)$$

When the transistor TR1 is turned on and then the electric current flows into the braking resistor R5 to lower the potential of the smoothing condenser C1, the transistor TR1 is turned off to resume charging.

By multiplying the maximum value Imax of the electric current determined by the equation (2) by the foregoing on/off duty cycle (using the measured value 27%), average regenerative current Iave is determined by the following equation (3):

$$Iave=Imax \cdot Duty=(18.95) \cdot (0.27)=5.1 \text{ A} \qquad (3)$$

(Charging Rate of Regenerative Energy into the Capacitor)

As conditions requisite for the capacitor 12, the capacitor 12 needs to have the capacitance for storing the regenerative energy generated by the electric motor M1 and the rated voltage from the connection circuit and the stored energy as described above. In addition, there is another condition on the charging rate of the regenerative energy to be stored.

According to Table 1, it will be determined what amount of charging current is flown into the capacitor at the step of feeding back the maximum regenerative energy within the shortest time in one-cycle operation. Then, it will also be examined whether the required braking torque can be obtained with the charging current and whether the regenerative energy generated by the electric motor can be charged into the capacitor 12 within a limited period of time.

This verification is used to determine whether the vertical carrier machine V can be controlled toward the target along a pre-decided velocity curve.

In addition, the determination on the "required braking torque" is made depending on whether the regenerative energy can be charged into the capacitance 12 in the capacitor regenerative operation at the same timing as that for converting the regenerative energy into heat energy by the braking resistor circuit 13 illustrated in FIG. 4.

According to Table 1, generation of the maximum regenerative energy in the shortest time corresponds to "high-speed ascent & deceleration" in the "high-speed ascent" at step S1. Regenerative energy of 5,244 J is generated within the operating time of 2.7 seconds. In the case of storing the regenerative energy into the capacitor 12, the voltage increase, the charging current, and the charging energy relative to the capacitor 12 will be calculated. However, it is assumed that the capacitor 12 is charged in advance up to 300V and the smoothing condenser C1 is not taken into account.

Since the energy of 5,244 J is stored into the capacitor 12 charged at 300V (V2) in 2.7 seconds, the capacitor voltage V1 after the storing will be determined using the equation (1) by the following equation (4):

$$V1=\sqrt{(2 \cdot (5,244)/1.5+300^2)}=311.4V \qquad (4)$$

That is, the capacitor voltage increases from 300V to 311.4V by 11.4V (ΔV).

Next, the average current Ireg required for charging of the capacitor 12 in 2.7 seconds (operating time (generation time of the regenerative energy) Ta) will be determined by the following equation (5):

$$Ireg=C \cdot \Delta V/Ta=(1.5) \cdot (11.4)/2.7=6.33 \text{ A} \qquad (5)$$

When the foregoing matters are taken together, during the regenerative operation of 2.7 seconds, when the average charging current Ireg of 6.33 A is flown into the capacitor 12, the regenerative energy of 5,244 J can be stored in the capacitor 12.

As a result, the initial capacitor potential of 300V increases to 311.4V by 11.4V.

When the average regenerative current Iave flowing into the braking resistor R5 expressed by the equation (3) is compared with the average charging current Ireg required for charging of the capacitor 12 expressed by the equation (5), the relationship Iave<Ireg holds, which causes no problem with the electrostatic capacitance of the capacitor 12.
(Charging Rate of the Capacitor (Power Density))

Subsequently, with regard to the performance of the capacitor 12, the direct-current internal resistance and the energy charging time will be discussed.

Assuming that the regenerative energy of 5,244 J is generated not in 2.7 seconds but instantaneously, it will be determined within what time the capacitor 12 can absorb (be charged with) the energy.

The voltage increase due to the electricity storage is 11.4V (ΔV) and the direct-current internal resistance R of the capacitor 12 is 0.206Ω, which is equivalent to the charging circuit of the capacitor 12 illustrated in FIG. 5(a) in which the voltage increase ΔV due to the electricity storage is indicated as V.

Time constant T of the equivalent circuit is T=CR=(1.5)·(0.206)=0.31 s, and the rate of change in charging current i is higher as the direct-current internal resistance R is smaller. The electrostatic capacitance C has a similar tendency, although consideration is to be given to the electrostatic capacitance C in relation to the storage capacitance.

In addition, it can be seen from FIG. 5(b) showing changes in the charging current i at time t in the equivalent circuit of FIG. 5(a) that an electric current value $I_0$ determined by dividing the voltage increase value (ΔV=V) by the direct-current internal resistance R of the capacitor 12 is almost zero ($I_{20}$=0.09 A) two seconds later, and the most (99.84%) of the regenerative energy of 5,244 J is charged into the capacitor 12 in about two seconds.

FIG. 5(b) further shows that:
When t=0, $I_0$=V/R=11.4/0.206=55 (A)
When t=∞, $I_\infty$=0 (A)

Time constant: $T = C \cdot R = 0.31$ (s)
Current value after 0.31 seconds:
$I_{031} = (V/R) \times e^{-t/CR} = 55 \times 2.72^{-0.31/0.31} = 20$ (A)
Residual rate: $e^{-t/CR} = 2.72^{-0.31/0.31} = 36.8\%$
Attenuation rate: 1−residual rate=63.2%
Current value after 2 seconds:
$I_{20} = (V/R) \times e^{-t/CR} = 55 \times 2.72^{-2/0.31} = 0.09$ (A)
Residual rate: $e^{-t/CR} = 2.72^{-2/0.31} = 0.16\%$
Attenuation rate: 1−residual rate=99.84%
V (V): Applied voltage, i (A): Charging current, e: Base of natural logarithm (2.72), C (F): Electrostatic capacitance, R ($\Omega$): Direct-current internal resistance, t(s): time.

Accordingly, the time (about two seconds) before the residual rate of the current value $I_0$ becomes almost zero (0.16%) is sufficiently shorter than the regenerative energy generation time (operating time Ta) of 2.7 seconds, which causes no problem with the charging rate of the capacitor 12.

(Selection Conditions for the Capacitor)

The selection conditions for the capacitor 12 based on the foregoing examination results are as follows:

(a) The capacitance of a brake unit required for performing optimum control of the vertical carrier machine V and the value of a braking resistor connected to the brake unit are determined using a conventional wide-use selection software program produced by an inverter manufacturer.

(b) Then, the average value of electric current flowing into the braking resistor circuit when the vertical carrier machine V enters regenerative operation is determined from the specifications for the smoothing condenser of the inverter and transistor on/off voltage parameters.

(c) When the average regenerative current Iave determined by the equation (3) (5.1 A in the example of the experimental installation) is the value of the electric current flowing into the braking resistor R5 when the maximum regenerative energy is generated in the shortest time and the relationship Iave<Ireg holds between the average regenerative current Iave and the average charging current Ireg determined by the equation (5) (6.33 A in the example of the experimental installation) under the same conditions, it is possible to generate the braking torque required for the electric motor. In the case of capacitor regenerative operation, the factor for deciding the average charging current is electrostatic capacitance.

(d) The condition requisite for stoppage of the carrier machine at a fixed position within a limited period of time is to charge the energy generated within duration of the regenerative operation in to the capacitor 12. The factor for making determination on that condition is the direct-current internal resistance R of the capacitor 12 illustrated in FIG. 5(*a*).

Figure 5:
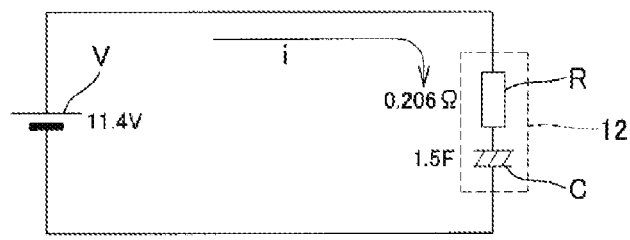
FIG. 5($a$) is a diagram illustrating an equivalent circuit for capacitor charging, and FIG. 5($b$) is a diagram illustrating temporal changes in charging current.
Figure 5:
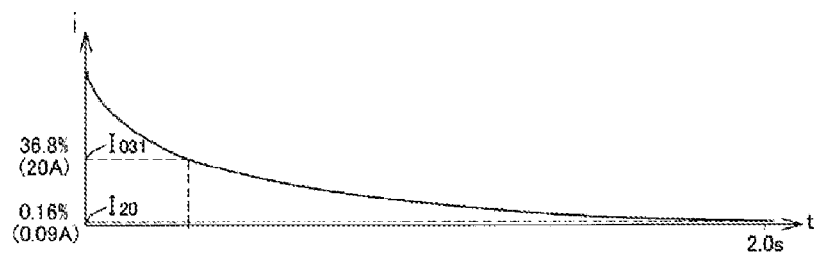

(e) Specifically, the requirements are that: the current value $I_0$ (55 A) determined by dividing the voltage increase value $\Delta V$ (11.4V) of the capacitor 12 due to storage of the generated energy by the direct-current internal resistance R (0.206$\Omega$) is sufficiently larger than the average current value Ireg (6.33 A) determined by the equation (5); when the time constant and the residual rate are determined from the product of the electrostatic capacitance C and the direct-current internal resistance R of the capacitor 12 and then it is determined what time is taken before the previously determined current value $I_0$ (55 A) illustrated in FIG. 5(*b*) reaches almost zero, the time is sufficiently shorter than the generation time of the regenerative energy (operating time Ta).

From the foregoing examination results, the conditions requisite for the drive control device for a drive system including the vertical carrier machine V with the capacitor 12 storing regenerative power in the present invention are as follows:

(1) The effective storable capacitance of the capacitor 12 meets the maximum amount of regenerative energy generated at a series of consecutive operations in one cycle operation of the vertical carrier machine V (such as ascent or descent).

Unless any constraint is placed on operating conditions, the capacitor 12 has an effective storable capacitance enough for the regenerative energy generated in one-cycle operation.

(2) The withstand voltage of the capacitor 12 (maximum peak voltage) is higher than the transistor on voltage of the regenerative resistor circuit part 5 to be combined. That is, the transistor on voltage of the regenerative resistor circuit part 5 is lower than the withstand voltage of the capacitor 12 (maximum peak voltage).

(3) With regard to the average charging current and the energy absorption rate in charging of the regenerative energy into the capacitor 12, all of the foregoing (capacitor selection conditions) (a) to (e) are satisfied.

(4) As a preventive measure against overflow of the capacitor 12, when the capacitor 12 is fully charged and the regenerative power is flown into the regenerative resistor R4, the regenerative resistor circuit part 5 to be combined with the capacitor 12 can flow an electric current capable of obtaining braking torque required for the vertical carrier machine V.

(5) For effective use of the regenerative energy generated by the vertical carrier machine V, the consumption energy of the carrier machine mainly for power operation to be combined is larger than the regenerative energy. The deficient power-operation energy is supplied from the primary power source to continue operation.

Among the foregoing conditions (1) to (5), the most important condition is (3) to allow velocity control to be performed on the vertical carrier machine V toward the target along the pre-decided velocity curve by making effective use of the regenerative power.

In the drive control device for a drive system including a vertical carrier machine according to the first embodiment illustrated in the block diagram of FIG. 1 and the flowchart of FIG. 2, the capacitor 12 is first charged, then the smoothing condenser C1 of the first inverter INV1 is charged, and then the smoothing condenser C2 of the second inverter INV2 are charged, thereby making the entire system operational.

The capacitor and the condensers are charged in a stepwise manner as described above to deal with the case where the current rating of the converter part 1 (rectifier circuit) in the first inverter INV1 is lower than the total of the charging current values of the capacitor 12 and the condensers C1 and C2. The method of charging in a stepwise manner (hereinafter, referred to as "stepwise charging method") has the advantage that the regenerative energy can be fully collected and reused.

Despite such an advantageous feature as described above, the stepwise charging method in the first embodiment has the disadvantage that the stepwise charging requires a certain period of waiting time (for example, about three minutes) until the operable signals of the first inverter INV1 and the second inverter INV2 are turned on to make the entire system operational.

For example, in production lines of automobiles and the like, when an emergency stop or severe failure takes place, the primary power source for the control panel is shut down to secure the safety of the system. When the stepwise charging method in the first embodiment is applied to such production lines, it is necessary to wait for a certain period of time until recovery of the system even if the power is supplied after correction of the failure, which leads to production loss. Thus, the stepwise charging method needs to be improved from the viewpoint of shortening the recovery time of the system.

A drive control device for a drive system including a vertical carrier machine according to second to fourth embodiments are devised to shorten the recovery time of the system (from the activation of the power source to the instant when the entire system becomes operational).

Second Embodiment

Figure 6:
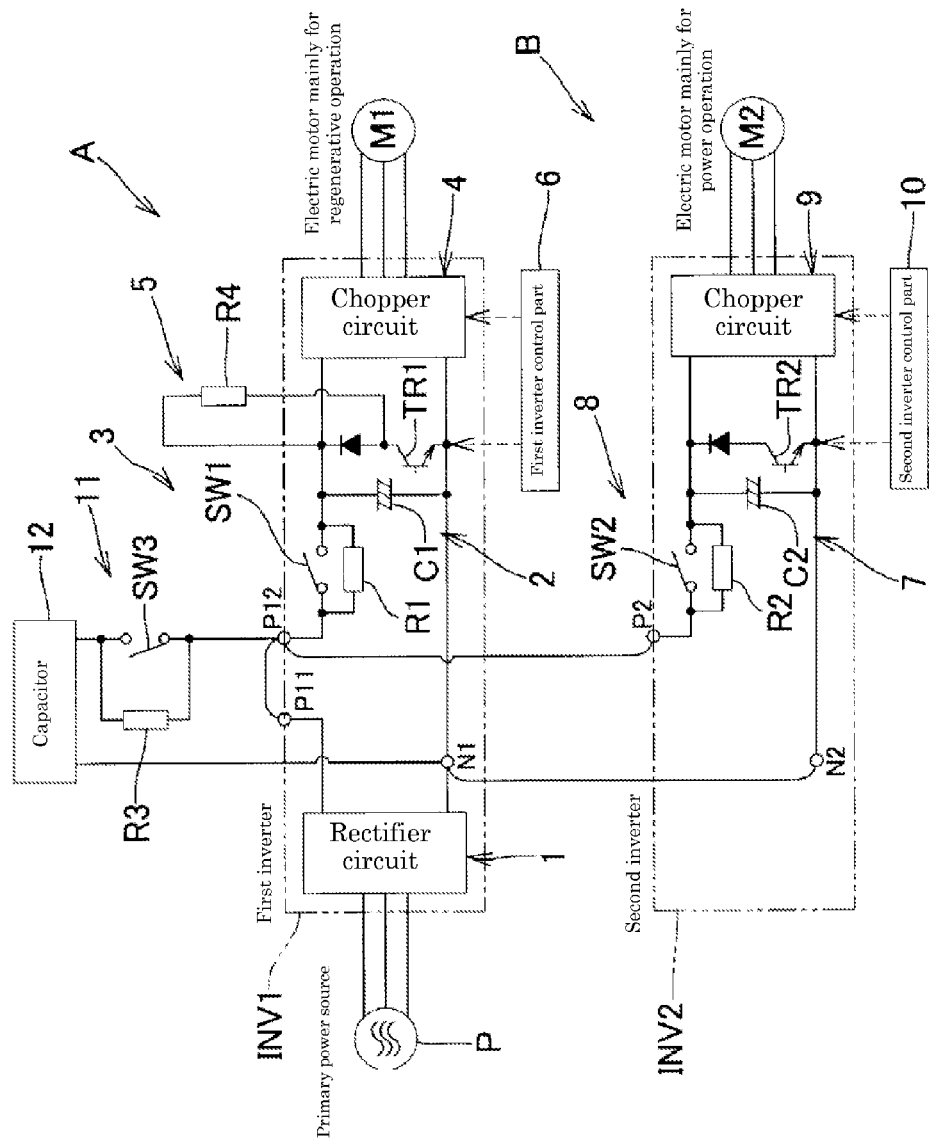
FIG. 6 is a block diagram of a configuration of a drive control device for a drive system including a vertical carrier machine according to a second embodiment of the present invention.
Figure 7:
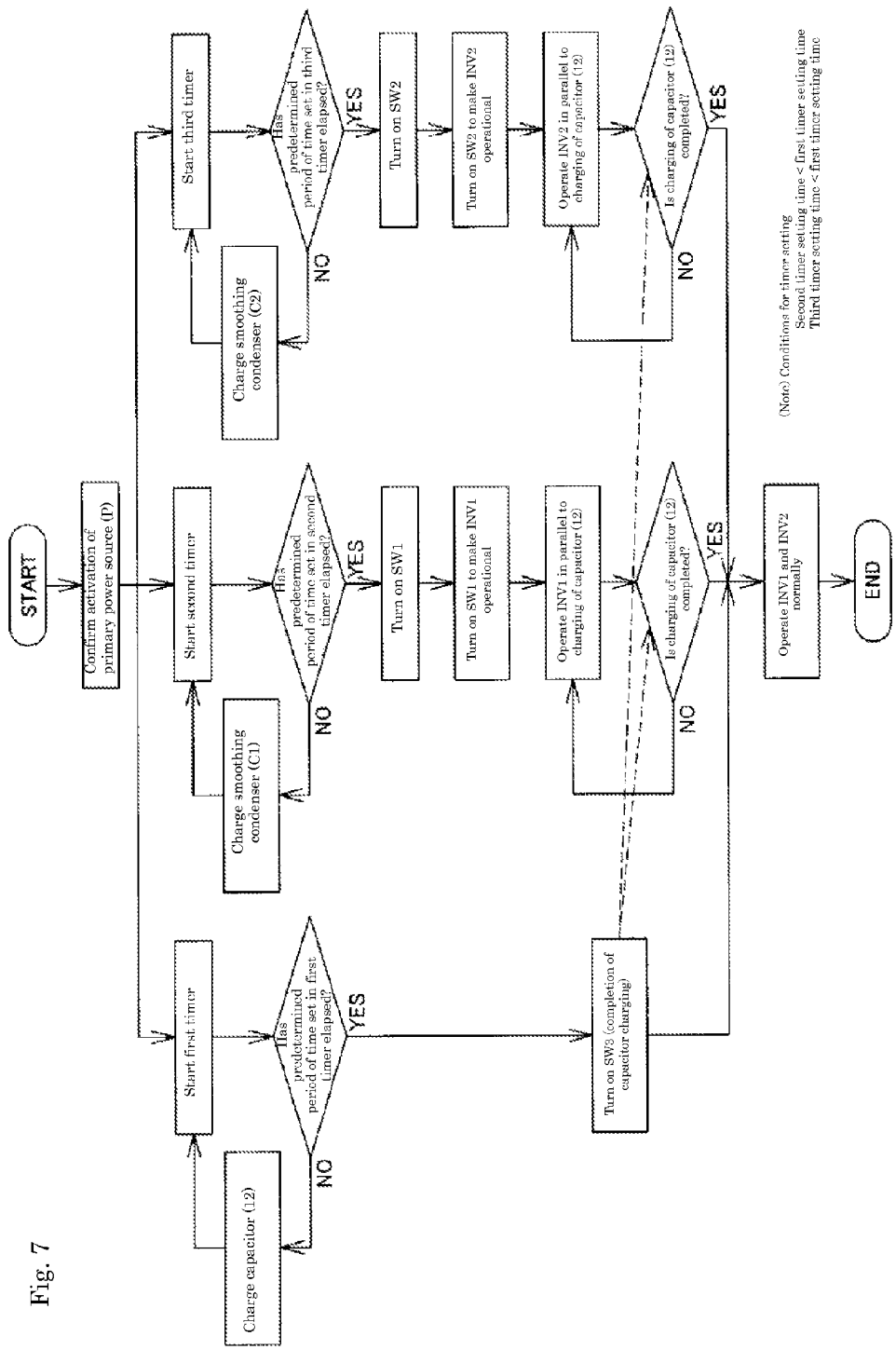
FIG. 7 is a flowchart of operations by the drive control device.

The block diagram of FIG. 6 and the flowchart of FIG. 7 illustrate a drive control device for a drive system including a vertical carrier machine according to a second embodiment of the present invention. The components of the second embodiment with the same reference signs as those of the first embodiment in FIG. 1 are identical or equivalent to those of the first embodiment in FIG. 1.

The capacitor 12 is connected directly to a positive terminal P11 of a direct-current output line not via the third resistor R3 but by the third switch SW3 that is turned on after the alternating-current primary power source P is turned on and the capacitor 12 is completely charged.

In parallel to the charging of the capacitor 12, the smoothing condenser C1 of the first smoothing circuit part 2 is charged through the first resistor R1, and after the charging of the first smoothing circuit part 2 is completed, the first switch SW1 is turned on and the first inverter INV1 becomes operational.

Further, in parallel to the charging of the capacitor 12 and the smoothing condenser C1, the smoothing condenser C2 of the second smoothing circuit part 7 is charged through the second resistor R2, and after the charging of the second smoothing circuit part 7 is completed, the second switch SW2 is turned on and the second inverter INV2 becomes operational.

As described above, in the drive control device for a drive system including a vertical carrier machine according to the second embodiment, upon activation of the primary power source P, the capacitor 12, the smoothing condenser C1, and the smoothing condenser C2 start to be charged collectively (hereinafter, referred to as "collective charging method"), and the inverters INV1 and INV2 become operational after respective waiting times set in the second timer and the third timer. Accordingly, the time from the activation of the power source to the instant when the entire system becomes operational is shorter than one second, which is significantly shorter than that in the stepwise charging method.

In the collective charging method, the charging current is larger and thus the current rating of the converter part 1 (rectifier circuit) needs to be set to a sufficient value.

The charging of the capacitor 12 takes a longer time than those of the smoothing condenser C1 and C2. In the collective charging method, therefore, the electric motor M1 driven by the first inverter INV1 and the electric motor M2 driven by the second inverter INV2 are likely to start operation before the charging of the capacitor 12 is completed.

Accordingly, when the electric motor M1 mainly for regenerative operation starts operation, the feedback regenerative power may be consumed as heat energy at the regenerative resistor R4 without being stored in the capacitor 12, although depending on the charging state of the capacitor 12. In this case, the efficiency of collecting the regenerative energy is lower than that in the stepwise charging method before the charging of the capacitor 12 is completed.

Third Embodiment

Figure 8:
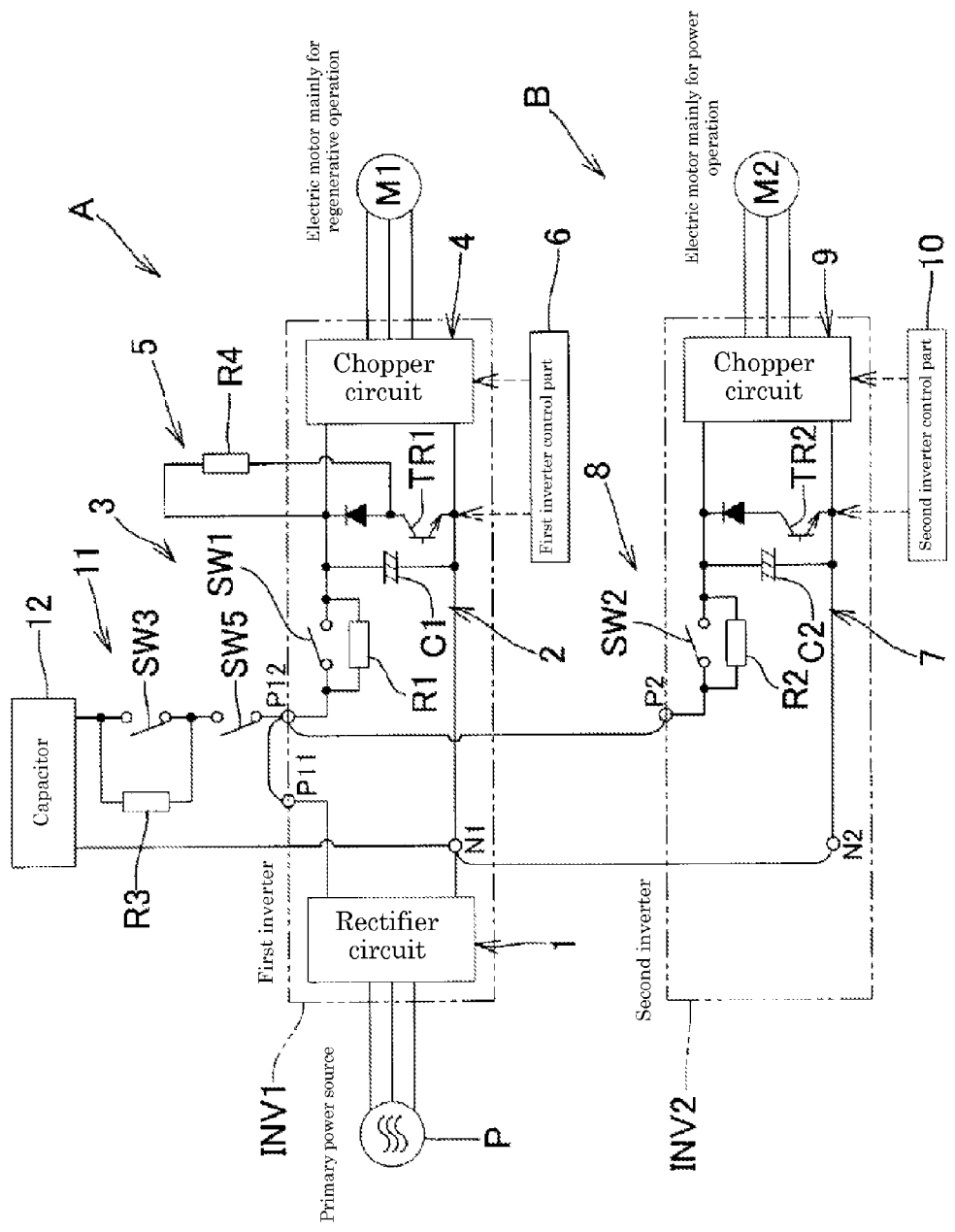
FIG. 8 is a block diagram of a configuration of a drive control device for a drive system including a vertical carrier machine according to a third embodiment of the present invention.
Figure 9:
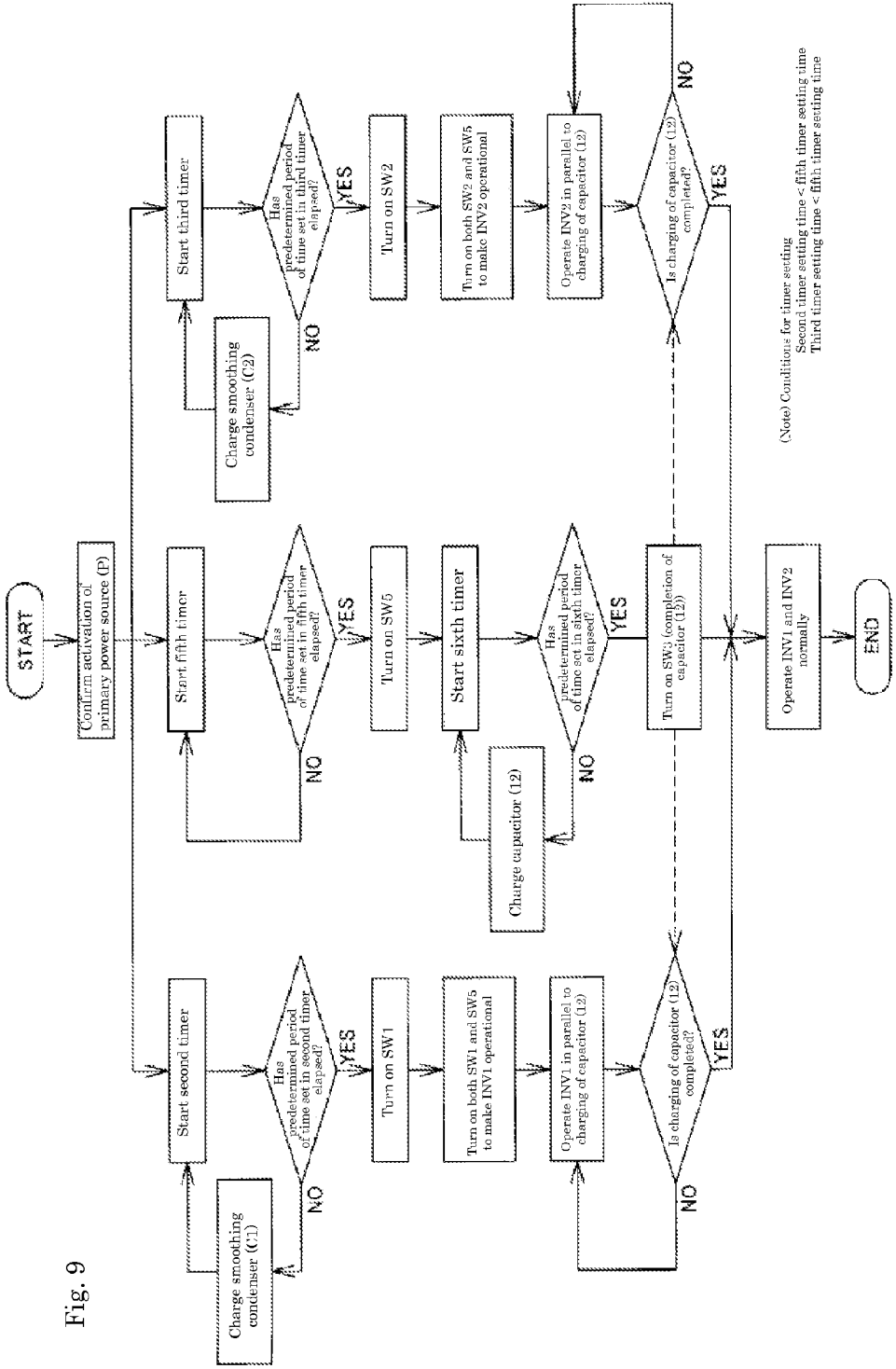
FIG. 9 is a flowchart of operations by the drive control device.

The block diagram of FIG. 8 and the flowchart of FIG. 9 illustrate a drive control device for a drive system including a vertical carrier machine according to a third embodiment of the present invention. The components of the third embodiment with the same reference signs as those of the first embodiment in FIG. 1 are identical or equivalent to those of the first embodiment in FIG. 1.

The capacitor 12 is connected directly to the positive terminal P11 of the direct-current output line not via the third resistor R3 but by the third switch SW3 that is turned on after the alternating-current primary power source P is turned on and the capacitor 12 is completely charged and a fifth switch SW5 that is connected in series to the third inrush current suppression circuit 11.

In the drive control device for a drive system including a vertical carrier machine according to the third embodiment, after the activation of the alternating-current primary power source P, the smoothing condenser C1 built in the first inverter INV1 and the smoothing condenser C2 built in the second inverter INV2 are first charged in parallel, and slightly later, the capacitor 12 is charged when the fifth timer with a setting time longer than those of the second timer and the third timer is up.

In this example, when the smoothing condensers C1 and C2 are completely charged and the fifth timer is up, the electric motors M1 and M2 become operational, and thus the capacitor 12 is charged while the electric motors M1 and M2 are operated (hereinafter, referred to as "parallel-operation charging method").

Accordingly, in the parallel-operation charging method, the first inverter INV1 and the second inverter INV2 become operational after the waiting time set in the fifth timer that is longer than those in the second timer and the third timer, and thus the time from the activation of the power source to the instant when the entire system becomes operational is several seconds, which is significantly shorter than that in the stepwise charging method.

In addition, the charging of the smoothing condensers C1 and C2 and the charging of the capacitor 12 are separated by the fifth timer (fifth switch SW5), which reduces a load on the converter part 1 (rectifier circuit).

In the parallel operation charging method, the electric motor M1 driven by the first inverter INV1 and the electric motor M2 driven by the second inverter INV2 start to operate before the charging of the capacitor 12 is completed. Accordingly, when the electric motor M1 mainly for regenerative operation starts operation, the feedback regenerative power may be consumed as heat energy at the regenerative resistor R4 without being stored in the capacitor 12, although depending on the charging state of the capacitor 12. In this case, the efficiency of collecting the regenerative energy is lower than that in the stepwise charging method before the charging of the capacitor 12 is completed.

The completion of charging is confirmed by the use of the second timer, the third timer, the fifth timer, and a sixth timer (refer to FIG. 9) according to the third embodiment, but may be confirmed by another means such as voltage detection.

Figure 10:
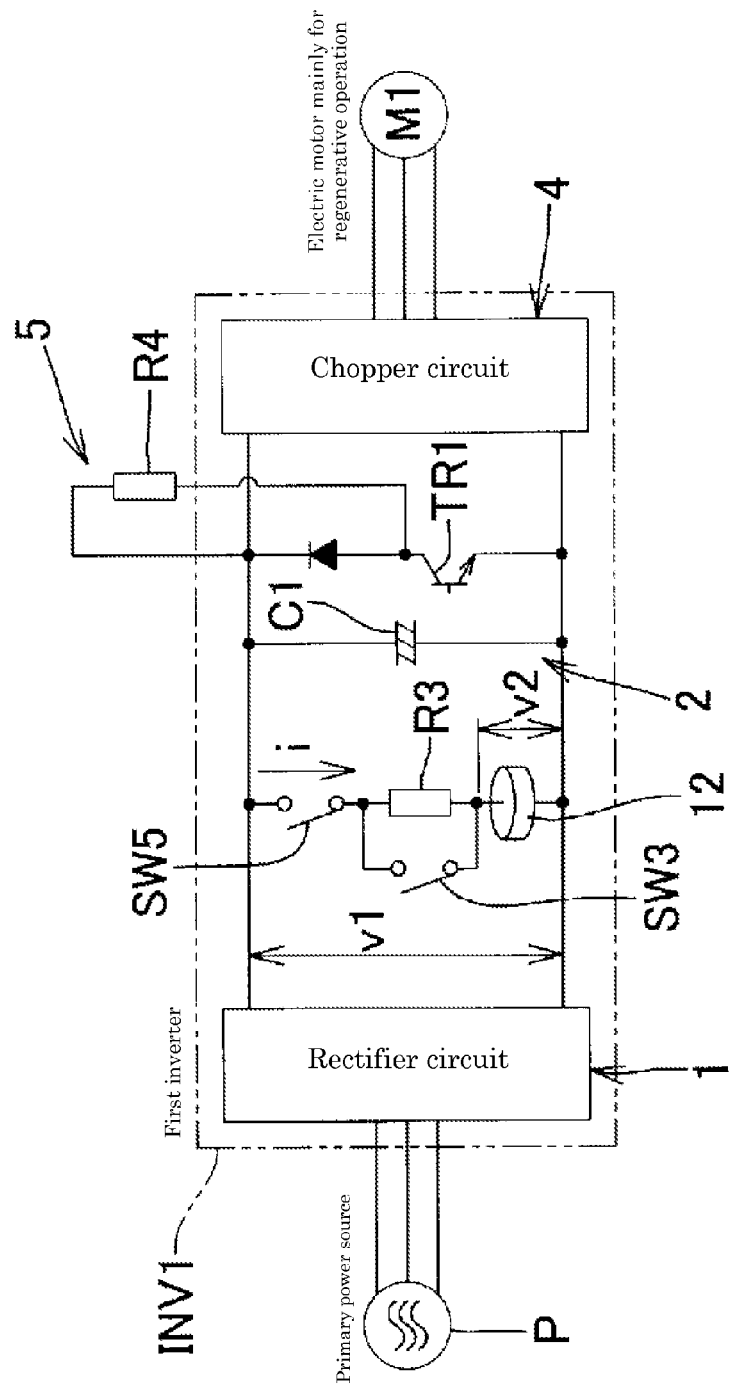
FIG. 10 illustrates an equivalent circuit for parallel operation charging in the vertical carrier machine.
Figure 11:
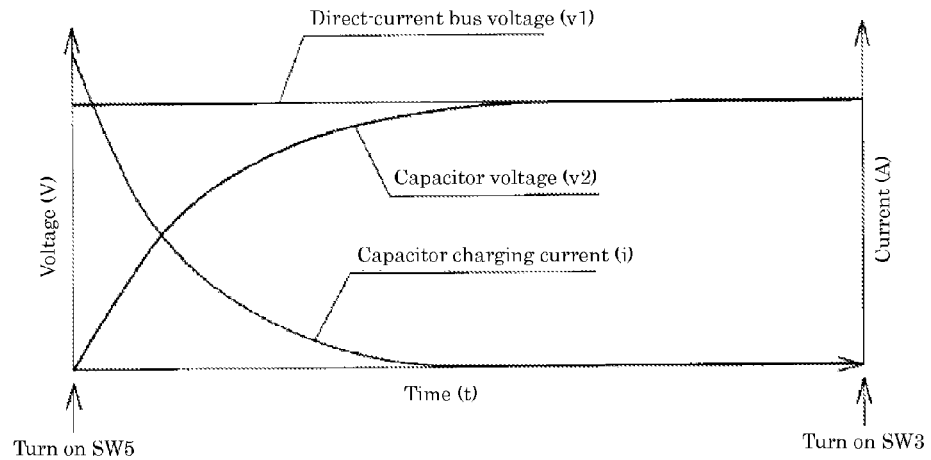
FIG. 11 includes diagrams illustrating a direct-current bus voltage during initial charging with SW5 in the on state and SW3 in the off state, and temporal changes in capacitor voltage and capacitor charging current.
Figure 11:
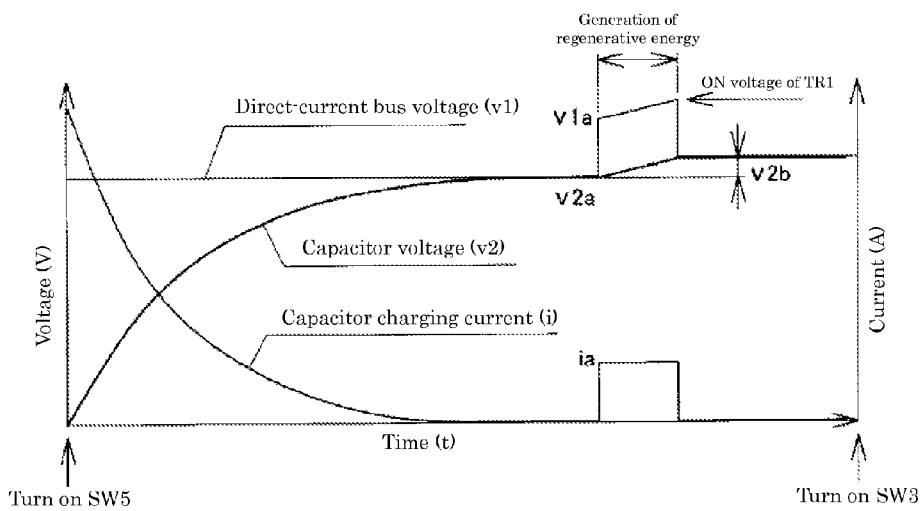

Hereinafter, descriptions will be given as to reduction in the efficiency of collecting regenerative energy, with reference to FIG. 10 illustrating the parallel-operation charging equivalent circuit of the vertical carrier machine, and FIG. 11 illustrating temporal changes in direct-current bus voltage (v1), capacitor voltage (v2), and capacitor charging current (i), in initial charging during which the fifth switch SW5 is in on state and the third switch SW3 is in off state illustrated in FIG. 10.

As compared to the case without generation of regenerative energy as illustrated in FIG. 11(a), in the case with generation of regenerative energy as illustrated in FIG. 11(b), when the regenerative power is fed back from the electric motor M1 mainly for regenerative operation during the initial charging of the capacitor 12, the regenerative power is first flown into the smoothing condenser C1 (several thousands of μF/several hundreds of mΩ) connected to the direct-current bus. At this moment, the inrush current suppression resistor R3 of several tens of Ω is connected to the capacitor circuit, and thus the charging rate of the capacitor 12 is very lower than that of the smoothing condenser C1. The smoothing condenser C1 with a higher charging rate is smaller in electrostatic capacitance, and thus the potential sharply increases to raise the direct-current bus voltage v1.

As a result, the direct-current bus voltage v1 increases to voltage value v1a, which causes a difference in potential from voltage value v2a at the both ends of the capacitor 12. The difference in potential causes the charging current ($ia = (v1a - v2a)/R3$) to flow into the inrush current suppression resistor R3.

Since the charging current ia flows until the end of the regenerative operation of the electric motor M1, the capacitor 12 stores the regenerative power to increase to the voltage value v2b.

Depending on the magnitude of the regenerative power during the regenerative operation of the electric motor M1 as described above, the direct-current bus voltage v1a is likely to exceed the on voltage of the regeneration transistor TR1. In this case, the regenerative power is not stored in the capacitor 12 but is consumed as heat energy at the regenerative resistor R4. This deteriorates the reuse efficiency of the regenerative energy.

Fourth Embodiment

Figure 12:
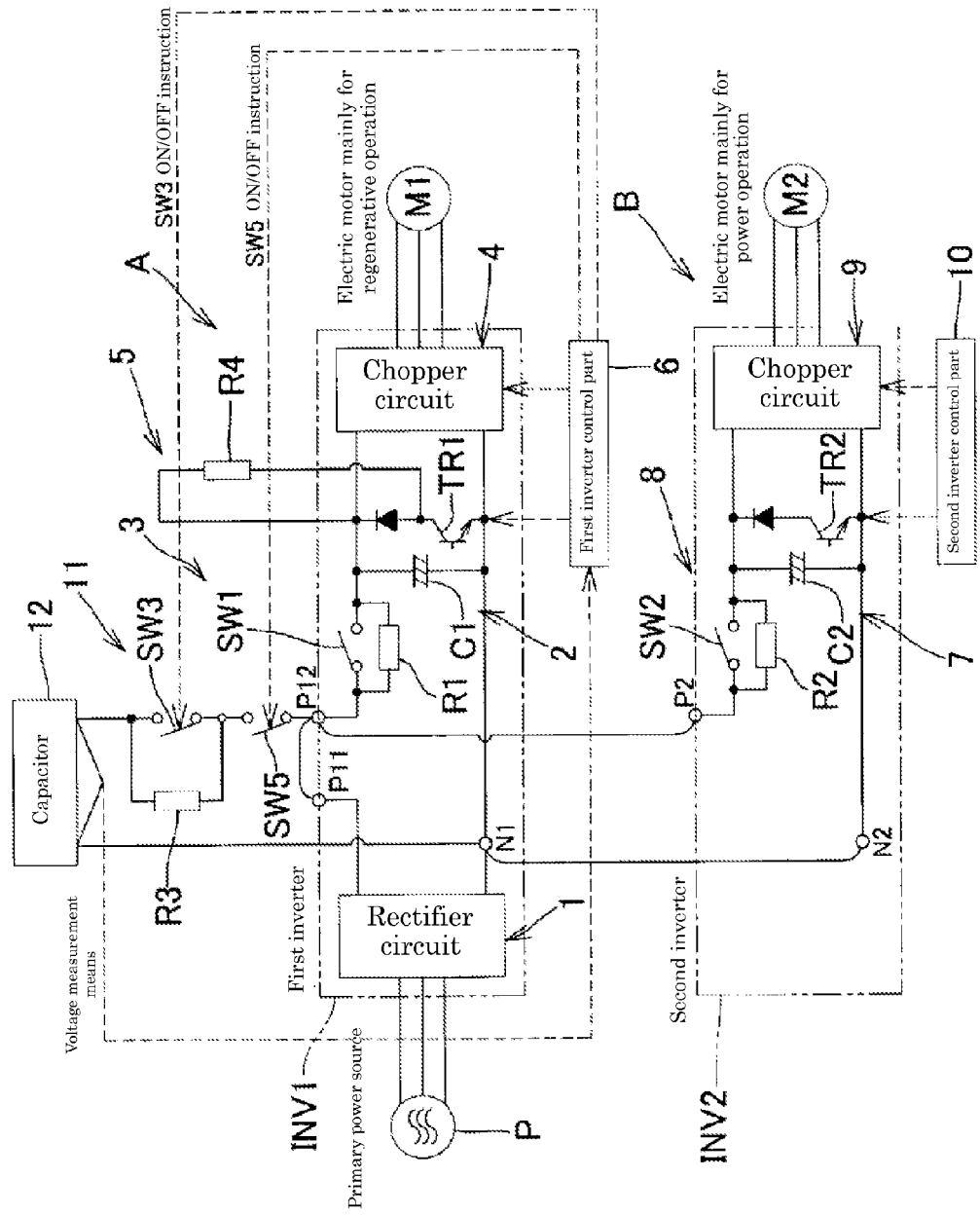
FIG. 12 is a block diagram of a configuration of a drive control device for a drive system including a vertical carrier machine according to a fourth embodiment of the present invention.
Figure 13:
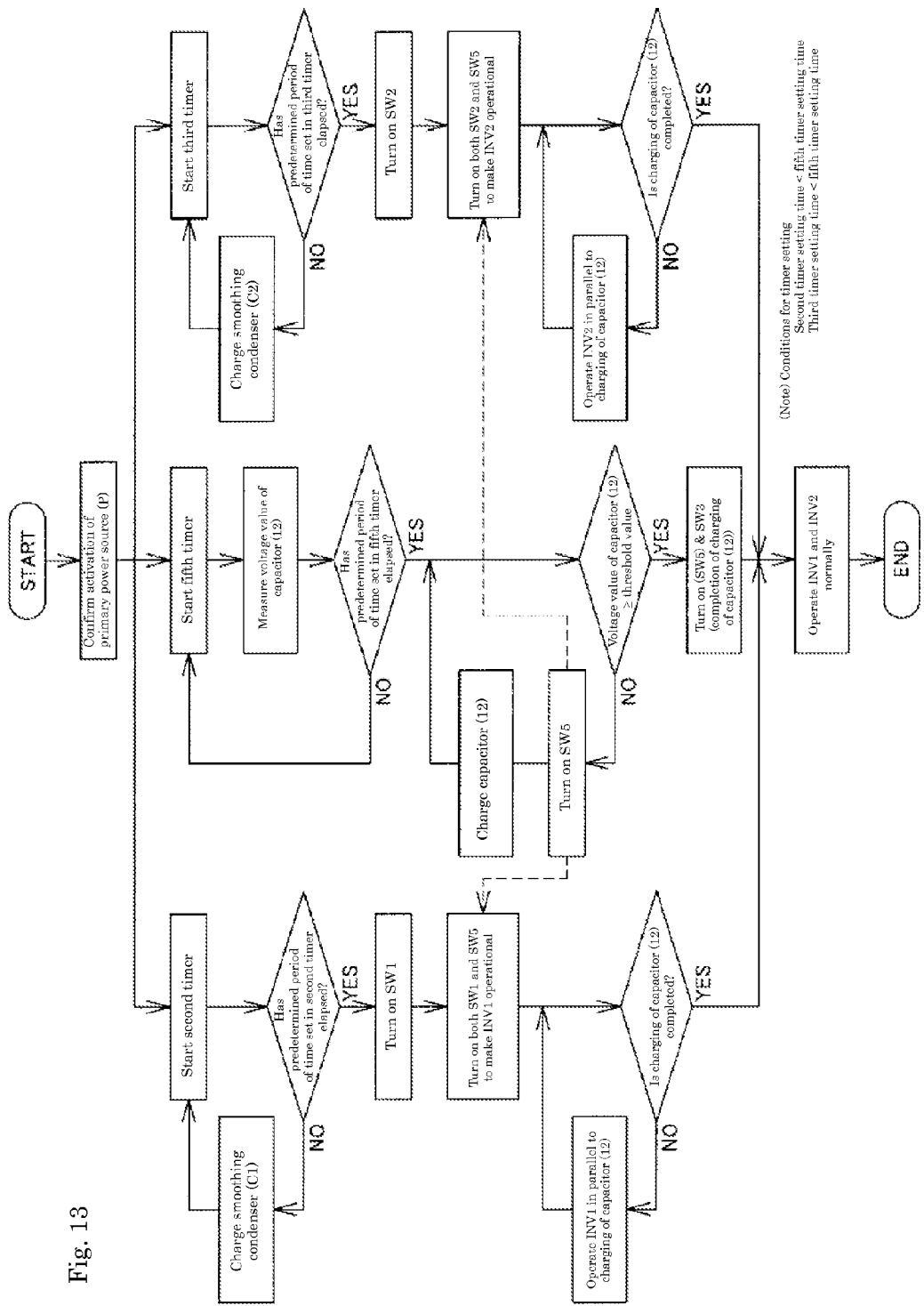
FIG. 13 is a flowchart of operations by the drive control device.

The block diagram of FIG. 12 and the flowchart of FIG. 13 illustrate a drive control device for a drive system including a vertical carrier machine according to a fourth embodiment of the present invention. The components of the fourth embodiment with the same reference signs as those of the first embodiment in FIG. 1 are identical or equivalent to those of the first embodiment in FIG. 1. The block diagram of FIG. 12 is the same as the block diagram of FIG. 8 of the third embodiment except for an additional voltage measurement means for the capacitor 12.

In the drive control device for a drive system including a vertical carrier machine according to the fourth embodiment, after the activation of the alternating-current primary power source P, the smoothing condenser C1 built in the first inverter INV1 and the smoothing condenser C2 built in the second inverter INV2 are first charged in parallel, and after the charging of the smoothing condensers C1 and C2 is completed, the voltage measurement means measures the voltage value of the capacitor 12 before the fifth switch SW5 is turned on to start charging of the capacitor 12 after lapse of the time set in the fifth timer. When the voltage value of the capacitor 12 is equal to or larger than a preset threshold value, the charging of the capacitor 12 is terminated before waiting for the lapse of the charging time, and then the fifth switch SW5 and the third switch SW3 are turned on simultaneously.

When the voltage value of the capacitor 12 measured by the voltage measurement means is smaller than the threshold value after lapse of the setting time in the fifth timer, the fifth switch SW5 is turned on to charge the capacitor 12 through the resistor R3, and when the voltage value of the capacitor 12 exceeds the threshold value, the third switch SW3 is turned on (hereinafter, referred to as "voltage-detection charging method").

Accordingly, in the voltage-detection charging method, the inverters INV1 and INV2 become operational after lapse of the waiting time set in the fifth timer that is longer than those in the second timer and the third timer. Thus, the time from the activation of the power source to the instant when the entire system becomes operational is about several seconds, which is significantly shorter than that in the stepwise charging method.

In addition, when the voltage value of the capacitor 12 is equal to or larger than the threshold value after lapse of the setting time in the fifth timer, there is no waiting time for the charging of the capacitor, which causes no deterioration in the reuse efficiency of regenerative energy as described above in relation to the third embodiment.

However, when the voltage value of the capacitor 12 measured by the voltage measurement means is smaller than the threshold value, there may occur a deterioration in the reuse efficiency of regenerative energy as in the case of the parallel-operation charging method.

The completion of charging is confirmed by the use of the second timer, the third timer, and the fifth timer (refer to FIG. 13) according to the fourth embodiment, but may be confirmed by another means such as voltage detection.

REFERENCE SIGNS LIST

A Drive control device for electric motor mainly for regenerative operation
B Drive control device for electric motor mainly for power operation
C Electrostatic capacitance of capacitor
CA Cage
C1, C2 Smoothing condenser
Dr. 1 to Dr. 9 Friction roller drive device
INV1 First inverter
INV2 Second inverter
INV3 Third inverter
H Horizontal delivery conveyor
M1 Electric motor mainly for regenerative operation
M2 Electric motor mainly for power operation
P Alternating-current primary power source
P11 Positive terminal of direct-current output line of converter part
P12 Positive terminal of direct-current bus of first inverter
P2 Positive terminal of direct-current bus of second inverter
N1 Negative terminal of direct-current output line of converter part
N2 Negative terminal of direct-current bus of second inverter
R Direct-current internal resistor of capacitor
R1 First resistor
R2 Second resistor
R3 Third resistor
R4 Regenerative resistor
R5 Braking resistor
SW1 First switch
SW2 Second switch
SW3 Third switch
SW4 Fourth switch
SW5 Fifth switch
TR1, TR2 Transistor
V Vertical carrier machine
1 Converter part
2 First smoothing circuit part
3 First inrush current suppression circuit
4 First inverter part
5 Regenerative resistor circuit part
6 First inverter control part
7 Second smoothing circuit part
8 Second inrush current suppression circuit
9 Second inverter part
10 Second inverter control part
11 Third inrush current suppression circuit
12 Capacitor
13 Braking resistor circuit

The invention claimed is:

1. A drive control device for a drive system including a vertical carrier machine, comprising:

a drive control device for an electric motor mainly for regenerative operation having a first inverter that is composed of a converter part that converts an alternating-current voltage supplied from an alternating-current primary power source into a direct-current voltage, a first smoothing circuit part that smoothes the direct-current voltage converted by the converter part, a first inrush current suppression circuit in which a first resistor and a first switch connected in parallel are connected to a primary side of the first smoothing circuit part, and a first inverter part that converts the direct-current voltage smoothed by the first smoothing circuit part into an alternating-current voltage at a variable voltage variable frequency and outputs the same to the electric motor mainly for regenerative operation in the vertical carrier machine, and a first inverter control part that controls the first inverter part to output the alternating-current voltage at a variable voltage variable frequency according to a velocity command;

a drive control device for an electric motor mainly for power operation having, between a positive terminal and a negative terminal of a direct-current output line of the converter part, a second inverter that is composed of a second smoothing circuit part that smoothes a direct-current voltage, a second inrush current suppression circuit in which a second resistor and a second switch connected in parallel are connected to a primary side of the second smoothing circuit part, a second inverter part that converts the direct-current voltage smoothed by the second smoothing circuit part into an alternating-current voltage at a variable voltage variable frequency and outputs the same to the electric motor mainly for power operation, and a second inverter control part that controls the second inverter part to output the alternating-current voltage at a variable voltage variable frequency according to a velocity command; and a capacitor that is connected between the positive terminal and the negative terminal of the direct-current output line of the converter part via a third inrush current suppression circuit in which a third resistor and a third switch are connected in parallel, to store direct-current regenerative power generated at an input portion of the first inverter part during regenerative operation of the electric motor mainly for regenerative operation, wherein the capacitor has an electrostatic capacitance (C) and a direct-current internal resistance (R) to produce a current value with which braking torque required for velocity control of the electric motor mainly for regenerative operation is generated by a charging current flowing at storage of the regenerative energy generated by the electric motor mainly for regenerative operation, within an operating time during which maximum regenerative energy is generated, in series of operations by the electric motor mainly for regenerative operation in the vertical carrier machine.

2. The drive control device for a drive system including a vertical carrier machine according to claim 1, wherein the capacitor has the electrostatic capacitance C in which an average charging current value $Ireg=C \cdot \Delta V/Ta$ determined by dividing the product $C \cdot \Delta V$ of the electrostatic capacitance C of the capacitor and a voltage increase value $\Delta V$ caused by storing the regenerative energy in the capacitor by the operating time Ta is larger than a current value Iave that allows generation of braking torque necessary for velocity control of the electric motor mainly for regenerative operation Iave<Ireg, and has the direct-current internal resistance R in which a current value $I_0 = \Delta V/R$ determined by dividing the voltage increase value $\Delta V$ by the direct-current internal resistance R of the capacitor is larger than the average charging current value Ireg $I_0$>Ireg.

3. The drive control device for a drive system including a vertical carrier machine according to claim 2, wherein the capacitor uses a calculation formula $e^{-t/CR}$ for current residual rate at time t with a time constant $T=C \cdot R$ determined by the product of the electrostatic capacitance C and the direct-current internal resistance R and the base e of natural logarithm to determine the residual rate of the current value $I_0$ determined by dividing the voltage increase value $\Delta V$ by the direct-current internal resistance R of the capacitor, and has the electrostatic capacitance C and the direct-current internal resistance R in which the time during which the residual rate is almost zero is shorter than the operating time Ta.

4. The drive control device for a drive system including a vertical carrier machine according to claim 1,
wherein an on voltage of the transistor in the regenerative resistor circuit part connected in parallel to the first smoothing circuit part is lower than a withstand voltage of the capacitor.

5. The drive control device for a drive system including a vertical carrier machine according to claim 1, wherein an effective storable capacitance of the capacitor is equal to or larger than the sum of regenerative energy generated in one-cycle operation of the vertical carrier machine.

6. The drive control device for a drive system including a vertical carrier machine according to claim 1, wherein
the capacitor is connected directly to the positive terminal of the direct-current output line not via the third resistor but by the third switch that is turned on after the alternating-current primary power source is turned on and the capacitor is completely charged, and the positive terminal of the direct-current output line and the positive terminal of a direct-current bus of the first inverter are short-circuited, and at the same time, the first smoothing circuit part is charged through the first resistor, and after the charging of the first smoothing circuit part is completed, the first switch is turned on and the first inverter becomes operational, and
at the same time as the first inverter becomes operational, a fourth switch is turned on to connect the positive terminal of the direct-current bus of the first inverter and the positive terminal of the direct-current bus of the second inverter, and at the same time, the second smoothing circuit part is charged through the second resistor, and after the second smoothing circuit part is completely charged, the second switch is turned on and the second inverter becomes operational.

7. The drive control device for a drive system including a vertical carrier machine according to claim 1, wherein
the capacitor is connected directly to the positive terminal of the direct-current output line not via the third resistor but by the third switch that is turned on after the alternating-current primary power source is turned on and the capacitor is completely charged,
the first smoothing circuit part is charged through the first resistor in parallel to the charging of the capacitor, and after the charging of the first smoothing circuit part is completed, the first switch is turned on and the first inverter becomes operational, and
the second smoothing circuit part is charged through the second resistor in parallel to the charging of the capacitor and the first smoothing circuit part, and after the charging of the second smoothing circuit part is completed, the second switch is turned on and the second inverter becomes operational.

8. The drive control device for a drive system including a vertical carrier machine according to claim 1, wherein the capacitor is connected directly to the positive terminal of the direct-current output line not via the third resistor but by the third switch that is turned on after the alternating-current primary power source is turned on and the capacitor is completely charged and a fifth switch that is connected in series to the third inrush current suppression circuit, after the activation of the alternating-current primary power source, the first smoothing circuit part is charged through the first resistor, and after the charging of the first smoothing circuit part is completed, the first switch is turned on, and the second smoothing circuit part is charged through the second resistor in parallel to the charging of the first smoothing circuit part, and after the charging of the second smoothing circuit part is completed, the second switch is turned on, and after the charging of the first smoothing circuit part and the second smoothing circuit part is completed, the fifth switch is turned on, and charging of the capacitor is started and the first inverter and the second inverter become operational.

9. The drive control device for a drive system including a vertical carrier machine according to claim 1, comprising a voltage measurement means for the capacitor, wherein the capacitor is connected directly to the positive terminal of the direct-current output line not via the third resistor but by the third switch that is turned on after the alternating-current primary power source is turned on and the capacitor is completely charged and the fifth switch that is connected in series to the third inrush current suppression circuit, after activation of the alternating-current primary power source, the first smoothing circuit part is charged through the first resistor, and after the charging of the first smoothing circuit part is completed, the first switch is turned on, and the second smoothing circuit part is charged through the second resistor in parallel to the charging of the first smoothing circuit part, and after the charging of the second smoothing circuit part is completed, the second switch is turned on, and after the charging of the first smoothing circuit part and the second smoothing circuit part is completed, when the voltage value of the capacitor measured by the voltage measurement means is less than a preset threshold value, the fifth switch is turned on and charging of the capacitor is started, and the first inverter and the second inverter become operational, and after completion of the charging, when the voltage value of the capacitor measured by the voltage measurement means is equal to or larger than the preset threshold value, the fifth switch is turned on and the charging of the capacitor is completed, and the first inverter and the second inverter become operational.

* * * * *